(12) United States Patent
Ly et al.

(10) Patent No.: US 10,575,258 B2
(45) Date of Patent: Feb. 25, 2020

(54) TECHNIQUES AND APPARATUSES FOR UPLINK POWER CONTROL

(71) Applicant: QUALCOMM Incorporated, San Diego, CA (US)

(72) Inventors: Hung Ly, San Diego, CA (US); Hao Xu, San Diego, CA (US); Wanshi Chen, San Diego, CA (US); Wei Zeng, San Diego, CA (US); Yi Huang, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 175 days.

(21) Appl. No.: 15/594,035

(22) Filed: May 12, 2017

(65) Prior Publication Data
US 2018/0124710 A1    May 3, 2018

Related U.S. Application Data

(60) Provisional application No. 62/413,785, filed on Oct. 27, 2016, provisional application No. 62/476,440, filed on Mar. 24, 2017.

(51) Int. Cl.
*H04W 52/14* (2009.01)
*H04L 5/00* (2006.01)
(Continued)

(52) U.S. Cl.
CPC ........ *H04W 52/146* (2013.01); *H04L 5/0007* (2013.01); *H04W 52/365* (2013.01); *H04W 52/367* (2013.01); *H04W 72/0413* (2013.01)

(58) Field of Classification Search
CPC . H04W 52/146; H04W 52/367; H04W 52/08; H04W 52/10; H04W 72/0413; H04L 5/0007
See application file for complete search history.

(56) References Cited

U.S. PATENT DOCUMENTS 8,913,672 B2    12/2014  Luo et al.
9,258,806 B2    2/2016   Falahati et al.
(Continued)

OTHER PUBLICATIONS

International Search Report and Written Opinion—PCT/US2017/057983—ISA/EPO—dated Feb. 5, 2018.
(Continued)

*Primary Examiner* — Kent Krueger
(74) *Attorney, Agent, or Firm* — Harrity & Harrity, LLP

(57) ABSTRACT

Certain aspects of the present disclosure generally relate to wireless communications. In some aspects, a wireless communications device may employ different power control loops, associated with different power control reference points, for uplink transmissions that use different uplink waveforms. In some aspects, a wireless communications device may generate and transmit a first type of PHR, associated with a DFT-s-OFDM-based type of uplink transmission, and/or a second type PHR associated with a CP-OFDM-based type of uplink transmission. In some aspects, a wireless communications device may selectively send a HARQ re-transmission using a particular uplink waveform based at least in part on information indicating whether the HARQ re-transmission is permitted to use an uplink waveform that is different from another uplink waveform used for a prior corresponding HARQ transmission or HARQ re-transmission. Numerous other aspects are provided.

30 Claims, 15 Drawing Sheets

(51) Int. Cl.
*H04W 52/36* (2009.01)
*H04W 72/04* (2009.01)

(56) References Cited

U.S. PATENT DOCUMENTS

| | | |
|---|---|---|
| 2010/0142455 A1 | 6/2010 | Imamura |
| 2014/0126530 A1 | 5/2014 | Siomina et al. |
| 2014/0204919 A1 | 7/2014 | Chen et al. |
| 2016/0309426 A1 | 10/2016 | Zhang et al. |
| 2018/0242264 A1* | 8/2018 | Pelletier .............. H04W 52/146 |

OTHER PUBLICATIONS

NTT DOCOMO et al., "Workplan for Study on NR Access Technology", 3GPP Draft; R1-1610052, 3rd Generation Partnership Project (3GPP), Mobile Competence Centre; 650, Route Des Lucioles; F-06921 Sophia-Anti Polls Cedex; France, vol. Ran WG1, No. Lisbon, Portugal; Oct. 9, 2016, XP051150077, Retrieved from the Internet: URL:http://www.3gpp.org/ftp/Meetings_3GPP_SYNC/RAN1/Docs/ [retrieved on Oct. 9, 2016], 50 pages.
Partial International Search Report—PCT/US2017/057983—ISA/EPO—dated Dec. 6, 2017.

\* cited by examiner

TECHNIQUES AND APPARATUSES FOR UPLINK POWER CONTROL

CROSS REFERENCE TO RELATED APPLICATIONS UNDER 35 U.S.C. § 119

This application claims priority to U.S. Provisional Patent Application No. 62/413,785 filed on Oct. 27, 2016 entitled "TECHNIQUES AND APPARATUSES FOR UPLINK POWER CONTROL," and U.S. Provisional Patent Application No. 62/476,440 filed on Mar. 24, 2017 entitled "TECHNIQUES AND APPARATUSES FOR UPLINK POWER CONTROL," which are incorporated by reference herein.

FIELD OF THE DISCLOSURE

Aspects of the present disclosure generally relate to wireless communications, and more particularly to techniques and apparatuses for performing uplink power control.

BACKGROUND

Wireless communications systems are widely deployed to provide various telecommunication services such as telephony, video, data, messaging, and broadcasts. Typical wireless communications systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by Third Generation Partnership Project (3GPP).

A wireless communications network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like).

These multiple access technologies have been adopted in various telecommunication standards to provide a common protocol that enables different wireless devices to communicate on a municipal, national, regional, and even global level. New radio (NR), which may also be referred to as 5G, is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL), using OFDMA with a CP and/or SC-FDMA (also known as discrete Fourier transform spread ODFM (DST-s-OFDM)) on the uplink (UL), as well as support beamforming, multiple-input multiple-output (MIMO) antenna technology, and carrier aggregation. However, as the demand for mobile broadband access continues to increase, there exists a need for further improvements in LTE, NR, and 5G technologies. Preferably, these improvements should be applicable to other multi-access technologies and the telecommunication standards that employ these technologies.

SUMMARY

In some aspects, a method for wireless communications by a wireless communications device may include determining whether to use a cyclic prefix orthogonal frequency-division multiplexing (CP-OFDM) based waveform or a discrete Fourier transform spread orthogonal frequency-division multiplexing (DFT-s-OFDM) based waveform for an uplink transmission; and selectively employing a first power control loop or a second power control loop based at least in part on the determining whether to use the CP-OFDM-based waveform or the DFT-s-OFDM-based waveform, where the first power control loop may be associated with a first power control reference point, and where the second power control loop may be associated with a second power control reference point, where the second power control reference point may be different from the first power control reference point.

In some aspects, a wireless communications device for wireless communications may include a memory and one or more processors, operatively coupled to the memory, configured to determine whether to use a CP-OFDM-based waveform or a DFT-s-OFDM-based waveform for an uplink transmission; and selectively employ a first power control loop or a second power control loop based at least in part on the determining whether to use the CP-OFDM-based waveform or the DFT-s-OFDM-based waveform, where the first power control loop may be associated with a first power control reference point, and where the second power control loop may be associated with a second power control reference point, where the second power control reference point may be different from the first power control reference point.

In some aspects, a non-transitory computer-readable medium may store one or more instructions for wireless communications. The one or more instructions, when executed by one or more processors of a wireless communications device, may cause the one or more processors to determine whether to use a CP-OFDM-based waveform or a DFT-s-OFDM-based waveform for an uplink transmission; and selectively employ a first power control loop or a second power control loop based at least in part on the determining whether to use the CP-OFDM-based waveform or the DFT-s-OFDM-based waveform, where the first power control loop may be associated with a first power control reference point, and where the second power control loop may be associated with a second power control reference point, where the second power control reference point may be different from the first power control reference point.

In some aspects, an apparatus for wireless communications may include means for determining whether to use a CP-OFDM-based waveform or a DFT-s-OFDM-based waveform for an uplink transmission; and means for selectively employing a first power control loop or a second power control loop based at least in part on the determining whether to use the CP-OFDM-based waveform or the DFT-s-OFDM-based waveform, where the first power control loop may be associated with a first power control reference point, and where the second power control loop may be associated with a second power control reference point, where the second power control reference point may be different from the first power control reference point.

In some aspects, a method for wireless communications by a wireless communications device may include associating a first type of power headroom report (PHR) with a DFT-s-OFDM-based type of uplink transmission, and associating a second type of PHR with a CP-OFDM-based type of uplink transmission; generating at least one of the first type of PHR or the second type of PHR; and transmitting the generated at least one of the first type of PHR or the second type of PHR.

In some aspects, a wireless communications device for wireless communications may include a memory and one or more processors, operatively coupled to the memory, configured to associate a first type of PHR with a DFT-s-OFDM-based type of uplink transmission, and associate a second type of PHR with a CP-OFDM-based type of uplink transmission; generate at least one of the first type of PHR or the second type of PHR; and transmit the generated at least one of the first type of PHR or the second type of PHR.

In some aspects, a non-transitory computer-readable medium may store one or more instructions for wireless communications. The one or more instructions, when executed by one or more processors of a wireless communications device, may cause the one or more processors to associate a first type of PHR with a DFT-s-OFDM-based type of uplink transmission, and associate a second type of PHR with a CP-OFDM-based type of uplink transmission; generate at least one of the first type of PHR or the second type of PHR; and transmit the generated at least one of the first type of PHR or the second type of PHR.

In some aspects, an apparatus for wireless communications may include means for associating a first type of PHR with a DFT-s-OFDM-based type of uplink transmission, and associating a second type of PHR with a CP-OFDM-based type of uplink transmission; means for generating at least one of the first type of PHR or the second type of PHR; and means for transmitting the generated at least one of the first type of PHR or the second type of PHR.

In some aspects, a method for wireless communications may include receiving information indicating whether a hybrid automatic repeat request (HARQ) re-transmission is permitted to use a first uplink waveform that is different from a second uplink waveform of a prior corresponding HARQ transmission or a prior corresponding HARQ re-transmission; and selectively sending the HARQ re-transmission using the second uplink waveform, or either the first uplink waveform or the second uplink waveform based at least in part on the information indicating whether the HARQ re-transmission is permitted to use the first uplink waveform.

In some aspects, a wireless communications device for wireless communications may include a memory and one or more processors, operatively coupled to the memory, configured to receive information indicating whether a HARQ re-transmission is permitted to use a first uplink waveform that is different from a second uplink waveform of a prior corresponding HARQ transmission or a prior corresponding HARQ re-transmission; and selectively send the HARQ re-transmission using the second uplink waveform, or either the first uplink waveform or the second uplink waveform based at least in part on the information indicating whether the HARQ re-transmission is permitted to use the first uplink waveform.

In some aspects, a non-transitory computer-readable medium may store one or more instructions for wireless communications. The one or more instructions, when executed by one or more processors of a wireless communications device, may cause the one or more processors to receive information indicating whether a HARQ re-transmission is permitted to use a first uplink waveform that is different from a second uplink waveform of a prior corresponding HARQ transmission or a prior corresponding HARQ re-transmission; and selectively send the HARQ re-transmission using the second uplink waveform, or either the first uplink waveform or the second uplink waveform based at least in part on the information indicating whether the HARQ re-transmission is permitted to use the first uplink waveform.

In some aspects, an apparatus for wireless communications may include means for receiving information indicating whether a HARQ re-transmission is permitted to use a first uplink waveform that is different from a second uplink waveform of a prior corresponding HARQ transmission or a prior corresponding HARQ re-transmission; and means for selectively sending the HARQ re-transmission using the second uplink waveform, or either the first uplink waveform or the second uplink waveform based at least in part on the information indicating whether the HARQ re-transmission is permitted to use the first uplink waveform.

In some aspects, a method of wireless communications by a wireless communications device may include determining whether to use a cyclic prefix orthogonal frequency-division multiplexing (CP-OFDM) based waveform or a discrete Fourier transform spread orthogonal frequency-division multiplexing (DFT-s-OFDM) based waveform for an uplink transmission; and selectively using a first maximum transmit power or a second maximum transmit power to determine a transmit power for the uplink transmission based at least in part on the determining whether to use the CP-OFDM-based waveform or the DFT-s-OFDM-based waveform, wherein the first maximum transmit power may be different from the second maximum transmit power.

Aspects generally include a method, apparatus, system, computer program product, non-transitory computer-readable medium, user equipment, wireless communications device, and processing system as substantially described herein with reference to and as illustrated by the accompanying drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
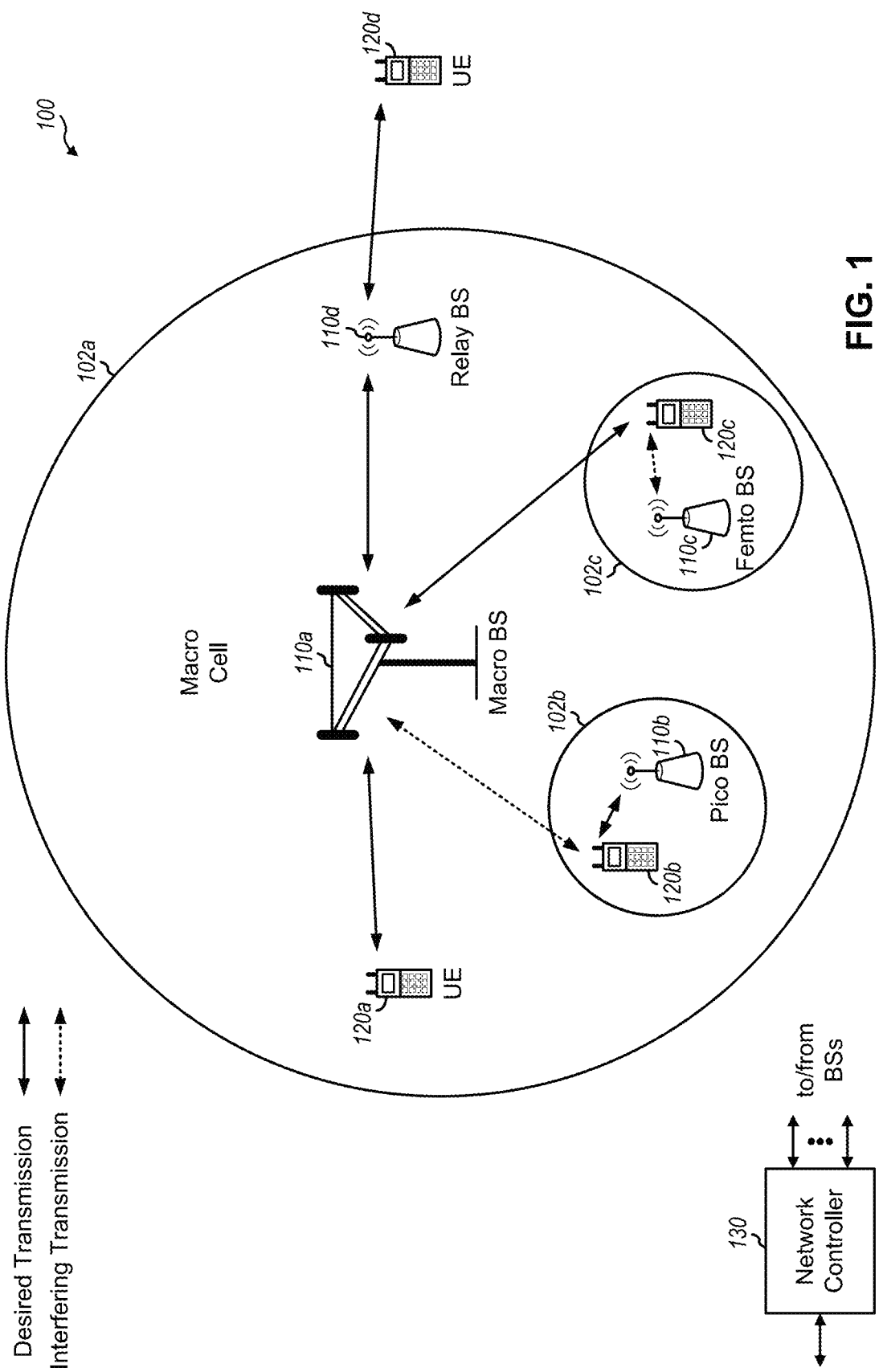
FIG. 1 is a block diagram conceptually illustrating an example of a wireless communications network, in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over another aspect. Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

An access point ("AP") may comprise, be implemented as, or known as NodeB, Radio Network Controller ("RNC"), eNodeB (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), Node B (NB), gNB, 5G NB, NR BS, Transmit Receive Point (TRP), or some other terminology.

An access terminal ("AT") may comprise, be implemented as, or be known as an access terminal, a subscriber station, a subscriber unit, a mobile station, a remote station, a remote terminal, a user terminal, a user agent, a user device, user equipment (UE), a user station, a wireless node, or some other terminology. In some aspects, an access terminal may comprise a cellular telephone, a smart phone, a cordless telephone, a Session Initiation Protocol ("SIP") phone, a wireless local loop ("WLL") station, a personal digital assistant ("PDA"), a tablet, a netbook, a smartbook, an ultrabook, a handheld device having wireless connection capability, a Station ("STA"), or some other suitable processing device connected to a wireless modem. Accordingly, one or more aspects taught herein may be incorporated into a phone (e.g., a cellular phone, a smart phone), a computer (e.g., a desktop), a portable communication device, a portable computing device (e.g., a laptop, a personal data assistant, a tablet, a netbook, a smartbook, an ultrabook), a wearable device (e.g., smart watch, smart glasses, smart bracelet, smart wristband, smart ring, smart clothing, etc.), medical devices or equipment, biometric sensors/devices, an entertainment device (e.g., music device, video device, satellite radio, gaming device, etc.), a vehicular component or sensor, smart meters/sensors, industrial manufacturing equipment, a global positioning system device, or any other suitable device that is configured to communicate via a wireless or wired medium. In some aspects, the node is a wireless node. A wireless node may provide, for example, connectivity for or to a network (e.g., a wide area network such as the Internet or a cellular network) via a wired or wireless communications link. Some UEs may be considered machine-type communication (MTC) UEs, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. Examples of MTC devices include sensors, meters, location tags, monitors, drones, robots/robotic devices, etc. MTC UEs, as well as other types of UEs, may be implemented as NB-IoT (narrowband internet of things) devices.

It is noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a network architecture 100 in which aspects of the present disclosure may be practiced. For example, the UE 120 (shown at UE 120a, UE 120b, UE 120c, and UE 120d) may determine whether to use a CP-OFDM-based waveform or a DFT-s-OFDM-based waveform for an uplink transmission, and may selectively employ a first power control loop or a second power control loop based at least in part on the determining whether to use the CP-OFDM-based waveform or the DFT-s-OFDM-based waveform, where the first power control loop is different from the second power control loop. As another example, UE 120 may associate a first type of power headroom report (PHR) with a DFT-s-OFDM-based type of uplink transmission, and associate a second type of PHR with a CP-OFDM-based type of uplink transmission, may generate at least one of the first type of PHR or the second type of PHR, and may transmit the generated at least one of the first type of PHR or the second type of PHR. As another example, UE 120 may receive information indicating whether a hybrid automatic repeat request (HARQ) re-transmission is permitted to use a first uplink waveform that is different from a second uplink waveform of a prior corresponding HARQ transmission or HARQ re-transmission, and may selectively send the HARQ re-transmission using the second uplink waveform, or either the first uplink waveform or the second uplink waveform based at least in part on the information indicating whether the HARQ re-transmission is permitted to use the first uplink waveform. As another example, UE 120 may determine whether to use a CP-OFDM-based waveform or a DFT-s-OFDM-based waveform for an uplink transmission, and may selectively use a first maximum transmit power or a second maximum transmit power to determine a transmit power for the uplink transmission based at least in part on the determining whether to use the CP-OFDM-based waveform or the DFT-s-OFDM-based waveform, where the first maximum transmit power is different from the second maximum transmit power.

The network 100 may be an LTE network or some other wireless network, such as a 5G or NR network. Wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G NB, an access point, a TRP, etc. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, etc.

Wireless network 100 may be a heterogeneous network that includes BSs of different types, e.g., macro BSs, pico BSs, femto BSs, relay BSs, etc. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium. Some UEs may be considered evolved or enhanced machine-type communication (eMTC) UEs. MTC and eMTC UEs include, for example, robots, drones, remote devices, such as sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices. Some UEs may be considered a Customer Premises Equipment (CPE).

In FIG. 1, a solid line with double arrows indicates desired transmissions between a UE and a serving BS, which is a BS designated to serve the UE on the downlink and/or uplink. A dashed line with double arrows indicates potentially interfering transmissions between a UE and a BS.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communications. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communications network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples are possible and may differ from what was described with regard to FIG. 1.

Figure 2:
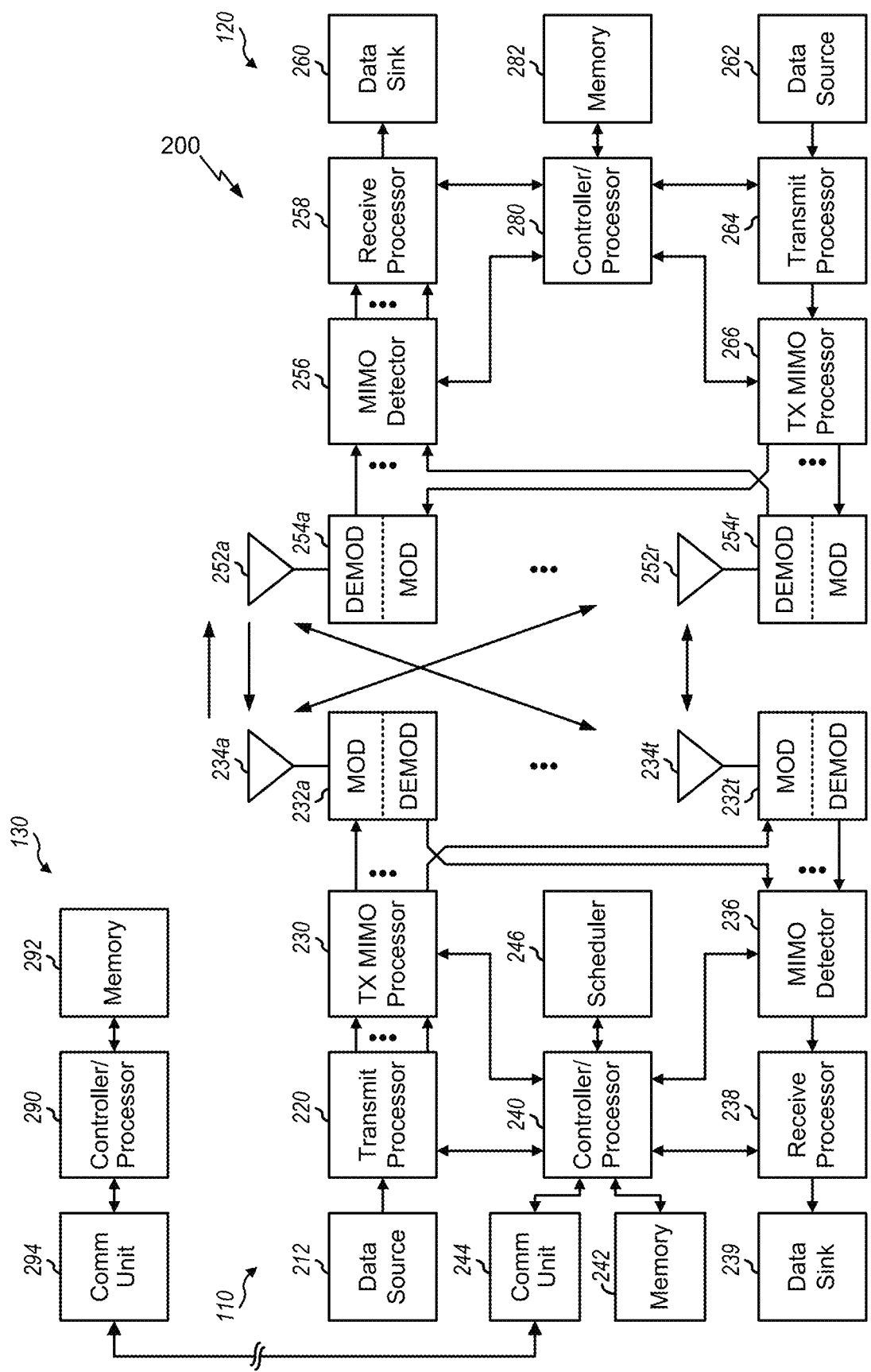
FIG. 2 shows a block diagram conceptually illustrating an example of a base station in communication with a user equipment (UE) in a wireless communications network, in accordance with certain aspects of the present disclosure.

FIG. 2 shows a block diagram of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T>1 and R>1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Transmit processor 220 may also generate reference symbols for reference signals (e.g., the CRS) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to certain aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controllers/processors 240 and 280 and/or any other component(s) in FIG. 2 may direct the operation at base station 110 and UE 120, respectively, to perform techniques presented herein for performing uplink power control. For example, controller/processor 280 and/or other processors and modules at UE 120, may perform or direct operations of UE 120 to perform techniques presented herein for performing uplink power control. For example, controller/processor 280 and/or other controllers/processors and modules at UE 120 may perform or direct processes 1000, 1200, 1400, and/or 1600 shown in FIGS. 10, 12, 14, and 16 respectively. Memories 242 and 282 may store data and program codes for base station 110 and UE 120, respectively. A scheduler 246 may schedule UEs for data transmission on the downlink and/or uplink.

As indicated above, FIG. 2 is provided merely as an example. Other examples are possible and may differ from what was described with regard to FIG. 2.

Figure 3:
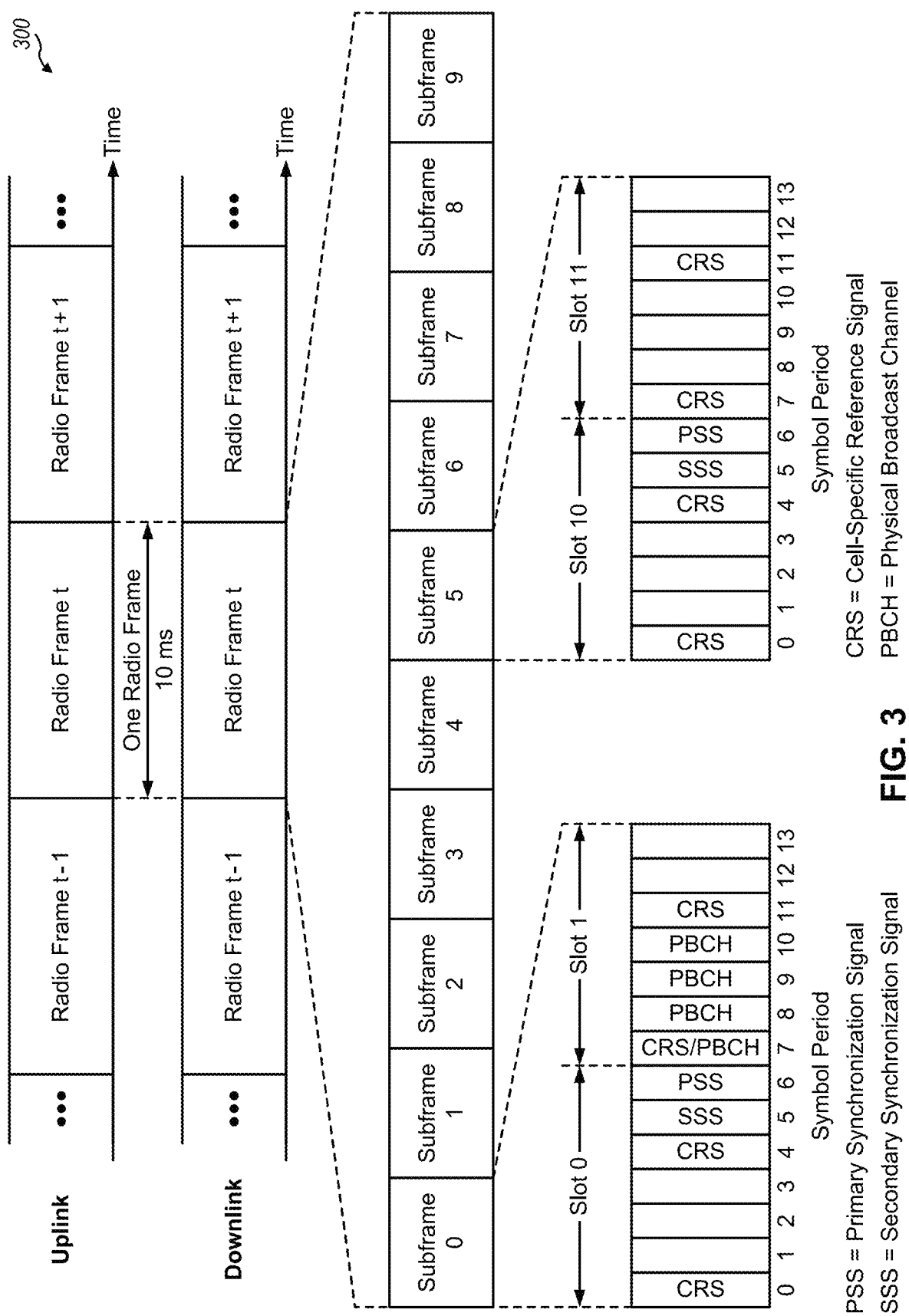
FIG. 3 is a block diagram conceptually illustrating an example of a frame structure in a wireless communications network, in accordance with certain aspects of the present disclosure.

FIG. 3 shows an example frame structure 300 for FDD in a telecommunications system (e.g., LTE). The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L-1.

In certain telecommunications (e.g., LTE), a BS may transmit a primary synchronization signal (PSS) and a secondary synchronization signal (SSS) on the downlink in the center of the system bandwidth for each cell supported by the BS. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The BS may transmit a cell-specific reference signal (CRS) across the system bandwidth for each cell supported by the BS. The CRS may be transmitted in certain symbol periods of each subframe and may be used by the UEs to perform channel estimation, channel quality measurement, and/or other functions. The BS may also transmit a physical broadcast channel (PBCH) in symbol periods 0 to 3 in slot 1 of certain radio frames. The PBCH may carry some system information. The BS may transmit other system information such as system information blocks (SIBs) on a physical downlink shared channel (PDSCH) in certain subframes. The BS may transmit control information/data on a physical downlink control channel (PDCCH) in the first B symbol periods of a subframe, where B may be configurable for each subframe. The BS may transmit traffic data and/or other data on the PDSCH in the remaining symbol periods of each subframe.

In other systems (e.g., such NR or 5G systems), a Node B may transmit these or other signals in these locations or in different locations of the subframe.

As indicated above, FIG. 3 is provided merely as an example. Other examples are possible and may differ from what was described with regard to FIG. 3.

Figure 4:
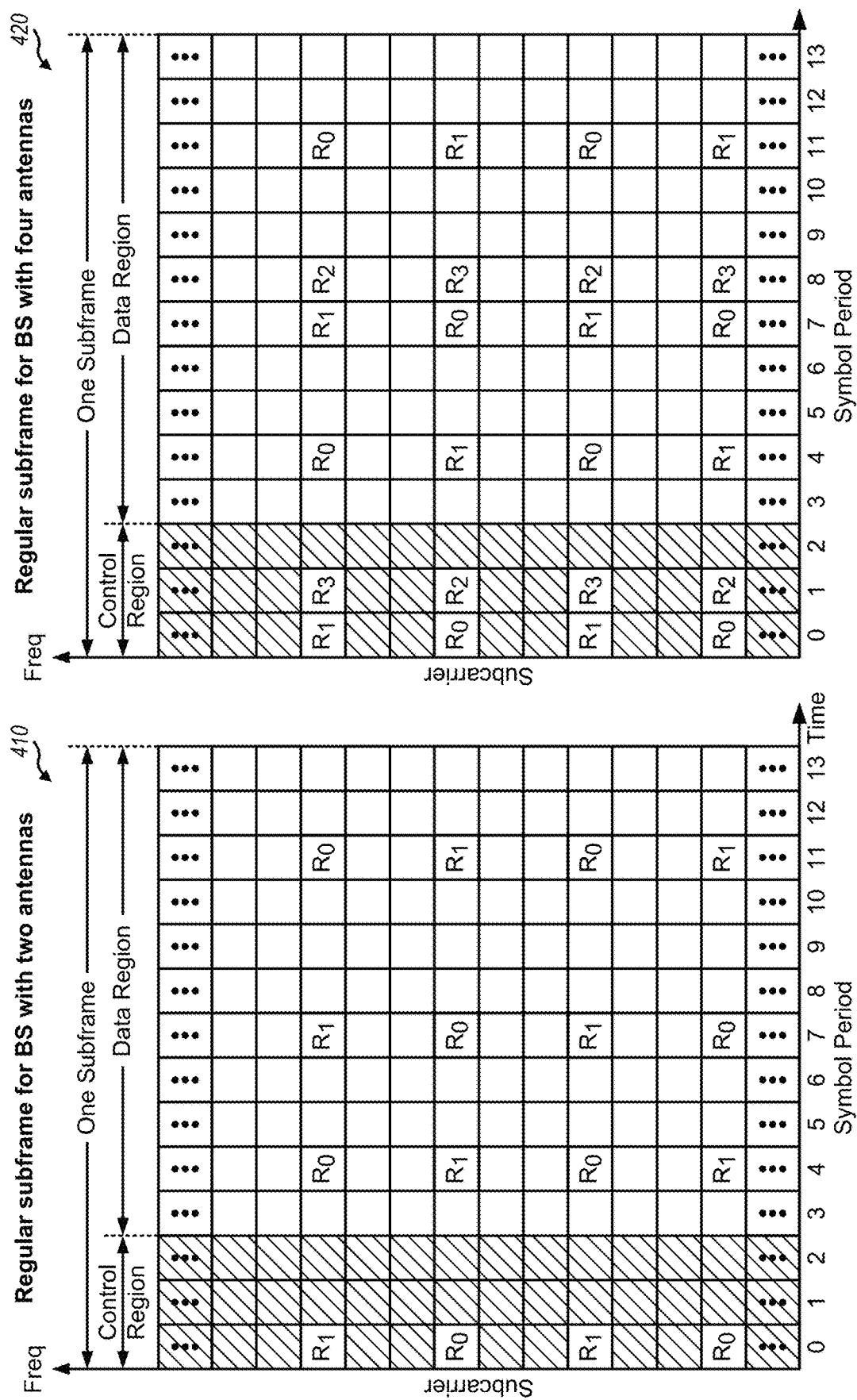
FIG. 4 is a block diagram conceptually illustrating two example subframe formats with the normal cyclic prefix, in accordance with certain aspects of the present disclosure.

FIG. 4 shows two example subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based at least in part on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based at least in part on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in certain telecommunications systems (e.g., LTE). For example, Q interlaces with indices of 0 through Q-1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission request (HARQ) for data transmission on the downlink and uplink. For HARQ, a transmitter (e.g., a BS) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with LTE technologies, aspects of the present disclosure may be applicable with other wireless communications systems, such as NR or 5G technologies.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as CP-OFDM) and/or SC-FDM on the uplink, may utilize CP-OFDM on the downlink and include support for half-duplex operation using TDD. In aspects, NR may utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra reliable low latency communications (URLLC) service.

A single component carrier bandwidth of 100 MHZ may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include DL/UL data as well as DL/UL control data. UL and DL subframes for NR may be as described in more detail below with respect to FIGS. 7 and 8.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

The RAN may include a central unit (CU) and distributed units (DUs). A NR BS (e.g., gNB, 5G Node B, Node B, transmit receive point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals—in some case cases DCells may transmit SS. NR BSs may transmit downlink signals to UEs indicating the cell type. Based at least in part on the cell type indication, the UE may communicate with the NR BS. For example, the UE may determine NR BSs to consider for cell selection, access, handover, and/or measurement based at least in part on the indicated cell type.

As indicated above, FIG. 4 is provided merely as an example. Other examples are possible and may differ from what was described with regard to FIG. 4.

Figure 5:
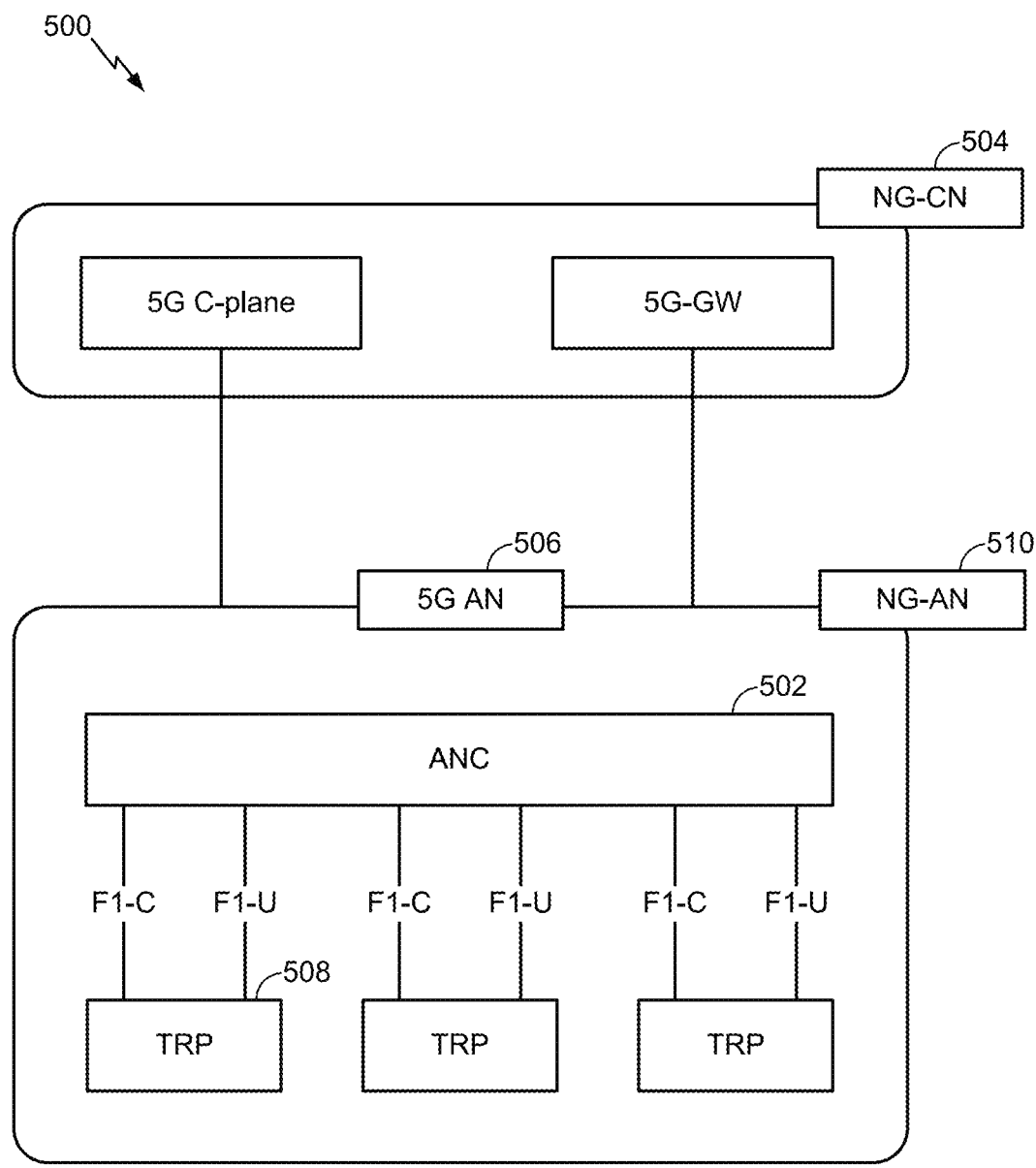
FIG. 5 illustrates an example logical architecture of a distributed radio access network (RAN), in accordance with certain aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture 500. The PDCP, RLC, MAC protocol may be adaptably placed at the ANC or TRP.

According to certain aspects, a BS may include a central unit (CU) (e.g., ANC 702) and/or one or more distributed units (e.g., one or more TRPs 508).

As indicated above, FIG. 5 is provided merely as an example. Other examples are possible and may differ from what was described with regard to FIG. 5.

Figure 6:
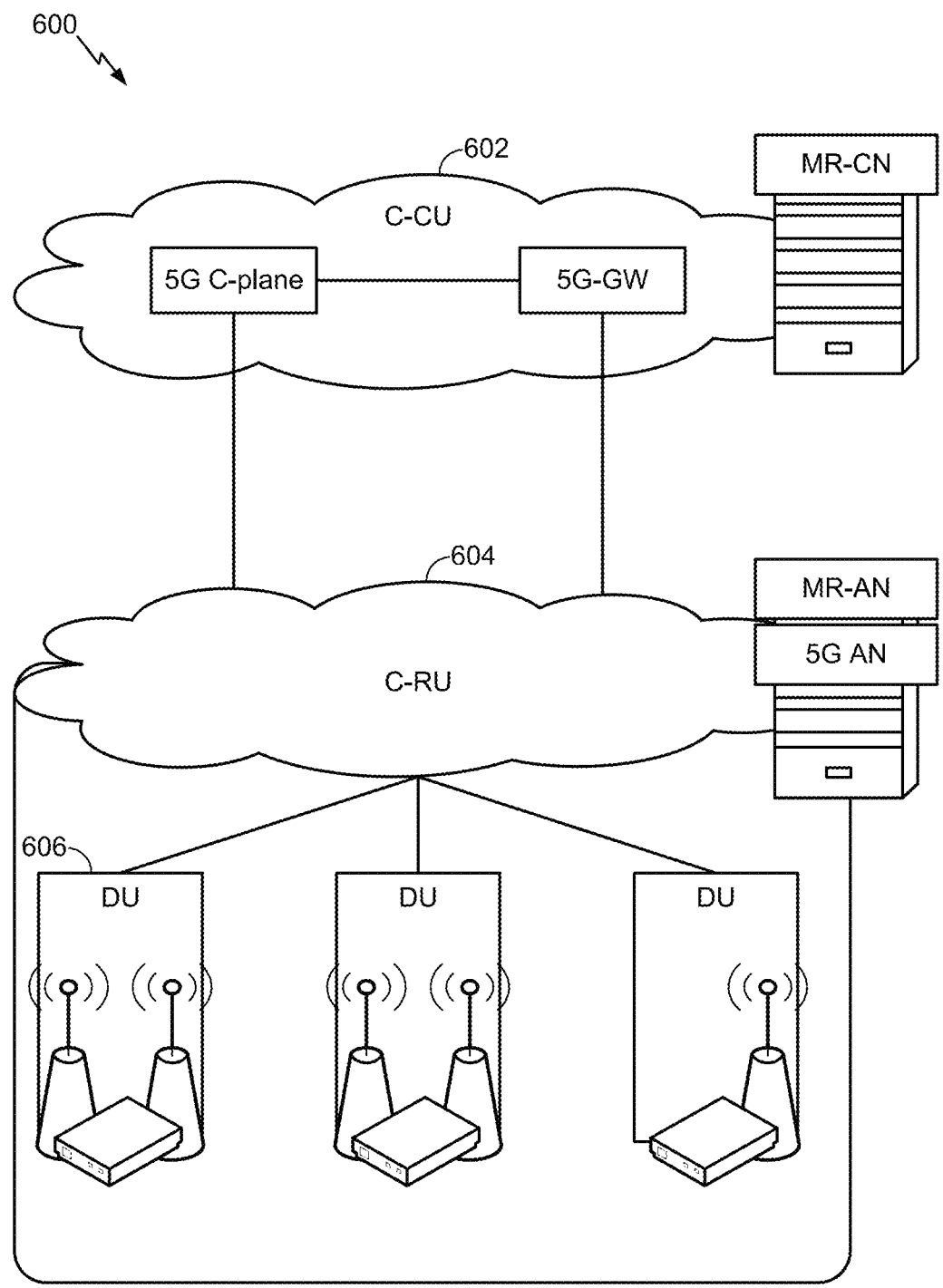
FIG. 6 illustrates an example physical architecture of a distributed RAN, in accordance with certain aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples are possible and may differ from what was described with regard to FIG. 6.

Figure 7:
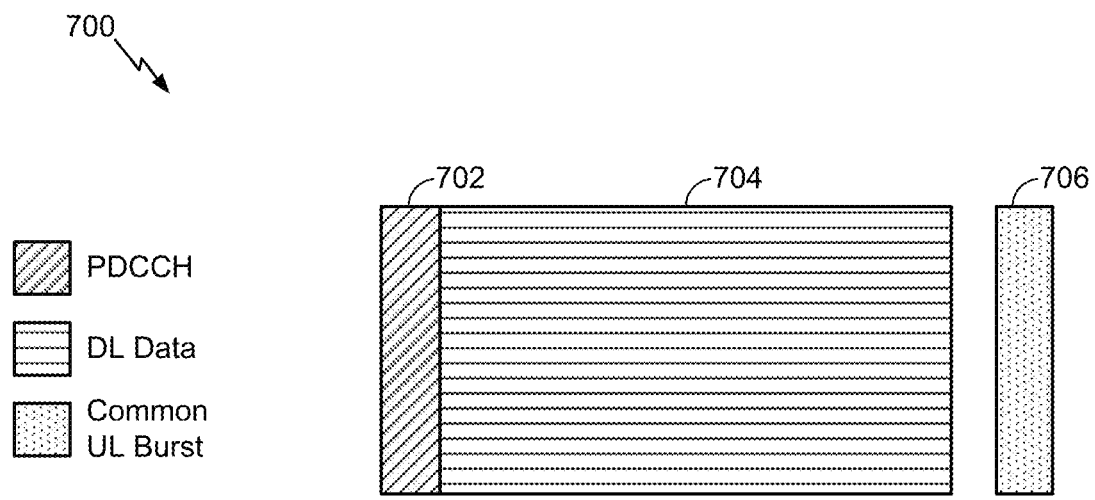
FIG. 7 is a diagram illustrating an example of a downlink (DL)-centric subframe, in accordance with certain aspects of the present disclosure.

FIG. 7 is a diagram 700 showing an example of a DL-centric subframe. The DL-centric subframe may include a control portion 702. The control portion 702 may exist in the initial or beginning portion of the DL-centric subframe. The control portion 702 may include various scheduling information and/or control information corresponding to various portions of the DL-centric subframe. In some configurations, the control portion 702 may be a physical DL control channel (PDCCH), as indicated in FIG. 7. The DL-centric subframe may also include a DL data portion 704. The DL data portion 704 may sometimes be referred to as the payload of the DL-centric subframe. The DL data portion 704 may include the communication resources utilized to communicate DL data from the scheduling entity (e.g., UE or BS) to the subordinate entity (e.g., UE). In some configurations, the DL data portion 704 may be a physical DL shared channel (PDSCH).

The DL-centric subframe may also include a common UL portion 706. The common UL portion 706 may sometimes be referred to as an UL burst, a common UL burst, and/or various other suitable terms. The common UL portion 706 may include feedback information corresponding to various other portions of the DL-centric subframe. For example, the common UL portion 706 may include feedback information corresponding to the control portion 706. Non-limiting examples of feedback information may include an ACK signal, a NACK signal, a HARQ indicator, and/or various other suitable types of information. The common UL portion 706 may include additional or alternative information, such as information pertaining to random access channel (RACH) procedures, scheduling requests, and various other suitable types of information. As illustrated in FIG. 7, the end of the DL data portion 704 may be separated in time from the beginning of the common UL portion 706. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

As indicated above, FIG. 7 is provided merely as an example. Other examples are possible and may differ from what was described with regard to FIG. 7.

Figure 8:
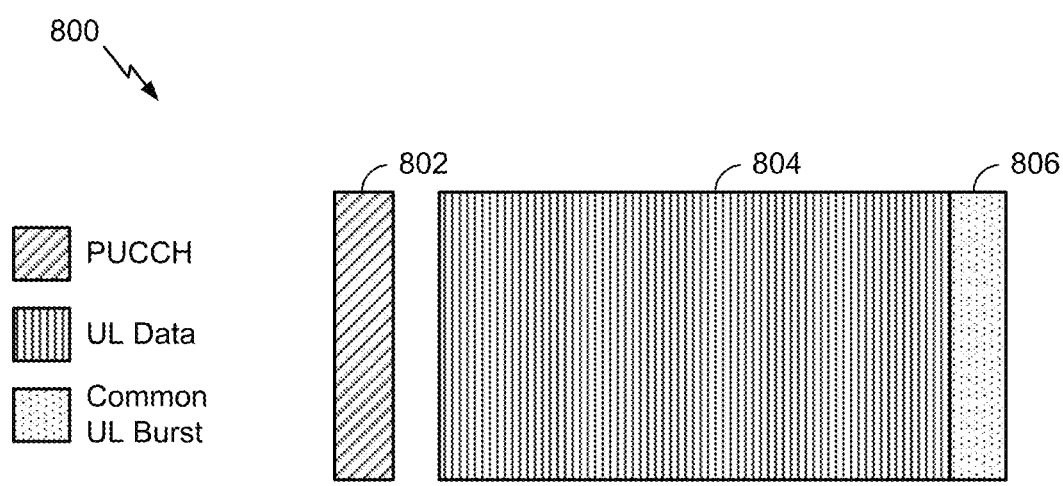
FIG. 8 is a diagram illustrating an example of an uplink (UL)-centric subframe, in accordance with certain aspects of the present disclosure.

FIG. 8 is a diagram 800 showing an example of an UL-centric subframe. The UL-centric subframe may include a control portion 802. The control portion 802 may exist in the initial or beginning portion of the UL-centric subframe. The control portion 802 in FIG. 8 may be similar to the control portion 802 described above with reference to FIG. 8. The UL-centric subframe may also include an UL data portion 804. The UL data portion 804 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 802 may be a physical UL shared channel (PUSCH).

As illustrated in FIG. 8, the end of the control portion 802 may be separated in time from the beginning of the UL data portion 804. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 806. The common UL portion 806 in FIG. 8 may be similar to the common UL portion 706 described above with reference to FIG. 7. The common UL portion 806 may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

In one example, a frame may include both UL centric subframes and DL centric subframes. In this example, the ratio of UL centric subframes to DL subframes in a frame may be dynamically adjusted based at least in part on the amount of UL data and the amount of DL data that are transmitted. For example, if there is more UL data, then the ratio of UL centric subframes to DL subframes may be increased. Conversely, if there is more DL data, then the ratio of UL centric subframes to DL subframes may be decreased.

As indicated above, FIG. 8 is provided merely as an example. Other examples are possible and may differ from what was described with regard to FIG. 8.

Figure 9A:
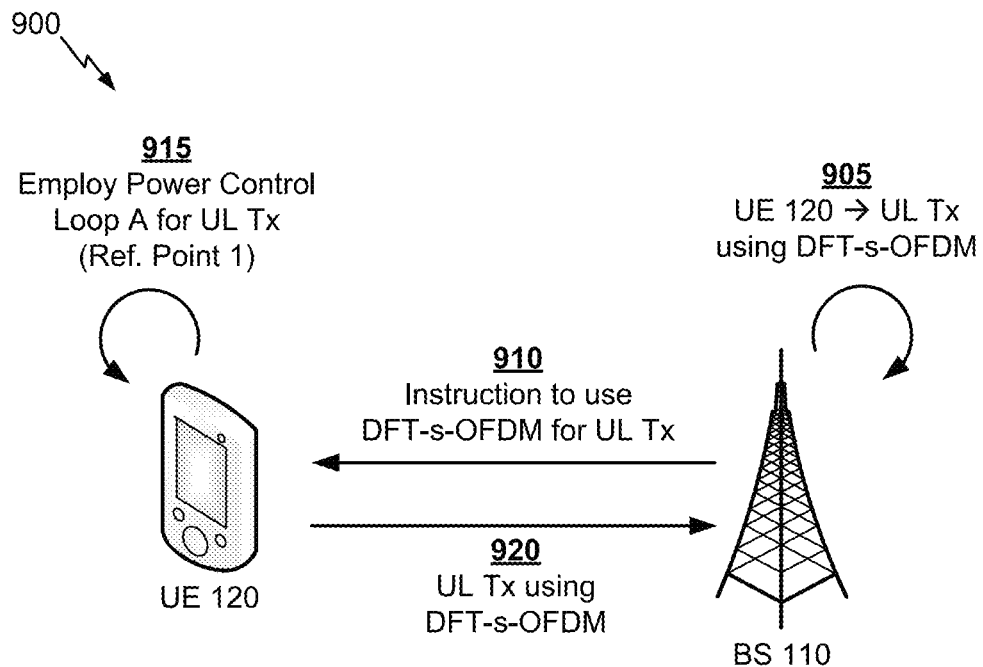
FIGS. 9A and 9B are diagrams illustrating an example of a UE employing different power control loops for uplink transmissions that use different uplink waveforms, in accordance with various aspects of the present disclosure.
Figure 9B:
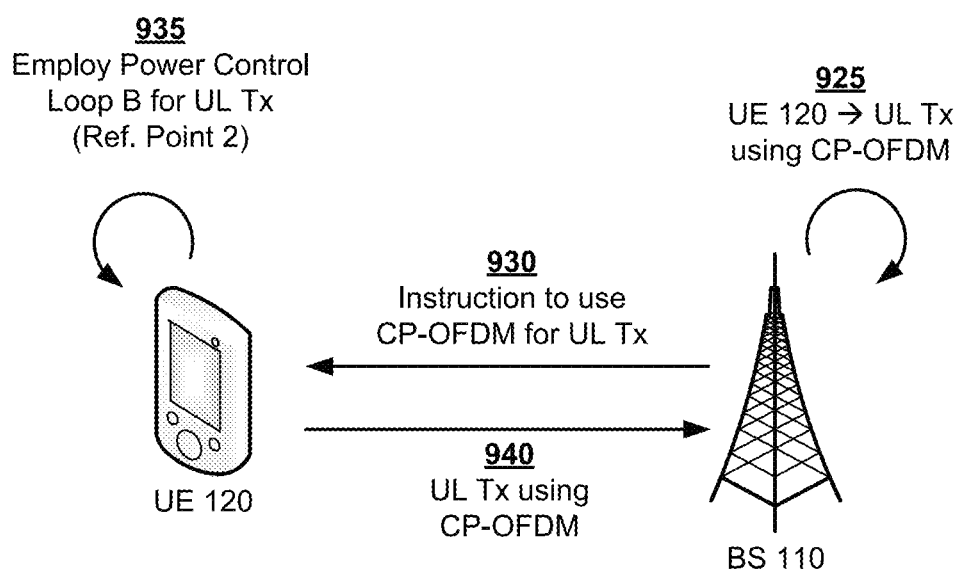

FIGS. 9A and 9B are illustrations of examples 900 of a UE employing different power control loops for uplink transmissions that use different uplink waveforms, in accordance with various aspects of the present disclosure. Example 900 includes a UE 120 capable of sending, to BS 110, an uplink transmission using a CP-OFDM-based waveform and/or a DFT-s-OFDM-based waveform.

Generally, a DFT-s-OFDM-based waveform has a lower peak-to-average power ratio (PAPR) than a CP-OFDM-based waveform, thereby providing for increased transmit power efficiency of UE 120 and/or allowing for a lower cost power amplifier to be included in UE 120. However, a CP-OFDM-based waveform may allow for a higher data rate and/or a reduced amount of inter-symbol interference (ISI) as compared to a DFT-s-OFDM-based waveform, without a need for a complex channel equalizer and/or channel estimation. As such, UE 120 may need to determine whether UE 120 is to send an uplink transmission using a DFT-s-OFDM-based waveform or a CP-OFDM-based waveform.

In some aspects, UE 120 may determine whether UE 120 is to use a DFT-s-OFDM-based waveform or a CP-OFDM-based waveform for an uplink transmission based at least in part on an instruction provided by BS 110. For example, in some aspects, BS 110 may determine whether UE 120 is to use a DFT-s-OFDM-based waveform or a CP-OFDM-based waveform based at least in part on a link budget associated with UE 120. As a particular example, in a case where the link budget, associated with UE 120, is relatively low (e.g., limited, not satisfying or less than a link budget threshold), then BS 110 may determine that UE 120 is to use a DFT-s-OFDM-based waveform for the uplink transmission. Alternatively, in a case where the link budget, associated with UE 120, is relatively high (e.g., satisfying or greater than or equal to the link budget threshold), then BS 110 may determine that UE 120 is to use a CP-OFDM-based waveform for the uplink transmission. For the purposes of FIG. 9A, and as shown by reference number 905, BS 110 determines that a link budget, associated with UE 120, is relatively low and, therefore, that UE 120 is to use a DFT-s-OFDM-based waveform for the uplink transmission. As another example, in some aspects, BS 110 may determine whether UE 120 is to use a DFT-s-OFDM-based waveform or a CP-OFDM-based waveform based at least in part on one or more power headroom reports, provided to BS 110 by UE 120, as described below.

As further shown in FIG. 9A, and by reference number 910, BS 110 may provide, to UE 120, an instruction indicating that UE 120 is to use a DFT-s-OFDM-based waveform for the uplink transmission. In some aspects, BS 110 may provide the instruction to UE 120 based at least in part on BS 110 scheduling the uplink transmission. Here, BS 110 may provide the instruction when BS 110 provides, to UE 120, scheduling information that identifies one or more resource blocks in which UE 120 is to send the uplink transmission.

In some aspects, a particular power control loop, associated with controlling transmission power of UE 120, may be employed by UE 120 based at least in part on the type of uplink waveform to be used for the uplink transmission. A power control loop may include a process, an algorithm, a formula, or like, by which an amount of power, used by UE 120 to send the uplink transmission, is controlled. In some aspects, employing a power control loop allows for compensation of channel fading, reduced inter-cell interference (e.g., by preventing UE 120 from transmitting with excessive power), increased uplink data rate, conservation of battery power, and/or the like, for wireless communications between UE 120 and BS 110. In some aspects, the power control loop may include an open-loop portion and/or a closed-loop portion.

The open-loop portion of the power control loop may control transmission power of UE 120 based at least in part on a variety of factors associated with UE 120 and/or the uplink transmission, such as a power control reference point associated with UE 120 (e.g., a base power level that includes a nominal power level and an offset power level specific to UE 120), a maximum allowable transmission power of UE 120, an amount of path loss (e.g., a path loss calculated by UE 120), a target receive power of BS 110, a transmission format of the uplink transmission (e.g., a particular modulation and coding scheme (MCS)), a number of resource blocks to be used for the uplink transmission, and/or the like. In some aspects, the open-loop portion of the power control loop is employed by UE 120.

The closed-loop portion of the power control loop may control transmission power of UE 120 based at least in part on feedback provided to UE 120 by BS 110. For example, BS 110 may calculate (e.g., based at least in part on information associated with an earlier uplink transmission by UE 120) an amount by which the transmission power of UE 120 is to change (e.g., relative to the earlier uplink transmission). Here, BS 110 may provide to UE 120 (e.g., on a PDCCH), a transmit power control (TPC) command that causes UE 120 to change the transmission power of UE 120 by the calculated amount.

In some aspects, the power control loop may be used to control transmission power for an uplink transmission on one or more types of channels, such as PUSCH, PUCCH, SRS, and/or the like.

In some aspects, UE 120 may employ a first power control loop for an uplink transmission that uses a DFT-s-OFDM-based waveform, and may employ a second (e.g., different) power control loop for an uplink transmission that uses a CP-OFDM-based waveform. For example, returning to FIG. 9A, and as shown by reference number 910, UE 120 may receive the instruction to send the uplink transmission using the DFT-s-OFDM-based waveform, and may employ a first power control loop (e.g., power control loop A) 915 based at least in part on the instruction to send the uplink transmission using the DFT-s-OFDM-based waveform. Here, in aspects, UE 120 may store information indicating that the first power control loop is to be employed for uplink transmissions that use a DFT-s-OFDM-based waveform.

In some aspects, the first power control loop may be different from the second power control loop that UE 120 employs for uplink transmissions that use a CP-OFDM-based waveform. For example, as indicated in FIG. 9A, when employing the first power control loop, UE 120 may set a power control reference point to a first value (e.g., reference point 1). In some aspects, the first value of the power control reference point may differ from a second value to which UE 120 sets the power control reference point when employing the second power control loop. As a result, control of the transmission power of UE 120 may differ for an uplink transmission that uses a DFT-s-OFDM-based waveform as compared to an uplink transmission that uses a CP-OFDM-based waveform. In some aspects, the power control reference point may differ among the different power control loops, as described in the above examples.

Additionally, or alternatively, another parameter, associated with the power control loop, by which the transmission power of UE 120 is controlled may be different among the different power control loops. Additionally, or alternatively, a different type of power control may be employed by the different power control loops (e.g., conventional power control, fractional power control, and/or the like).

As further shown in FIG. 9A, and by reference number 920, based at least in part on receiving the instruction and employing the first power control loop (e.g., the power control loop corresponding to DFT-s-OFDM-based uplink transmission), UE 120 may send, using a DFT-s-OFDM-based waveform, the uplink transmission using an amount of power as dictated by the first power control loop.

FIG. 9B is an example illustrating use of the second power control loop for sending an uplink transmission using a CP-OFDM-based waveform. As shown in FIG. 9B, and by reference number 925, BS 110 determines (e.g., based at least in part on determining that a link budget, associated with UE 120 satisfying a link budget threshold) that UE 120 is to send an uplink transmission (e.g., an uplink transmission after (or before) the uplink transmission associated with FIG. 9A) using a CP-OFDM-based waveform.

As shown by reference number 930, BS 110 may provide, to UE 120, an instruction that UE 120 is to use a CP-OFDM-based waveform for the uplink transmission. As shown by reference number 935, UE 120 may receive the instruction to send the uplink transmission using the CP-OFDM-based waveform, and may employ the second power control loop (e.g., power control loop B) based at least in part on the instruction. Here, UE 120 may store information indicating that the second power control loop is to be employed for uplink transmissions that use a CP-OFDM-based waveform. As indicated in FIG. 9B, when employing the second power control loop, UE 120 may set a power control reference point to the second value (e.g., reference point 2).

As further shown in FIG. 9B, and by reference number 940, based at least in part on receiving the instruction and employing the second power control loop (e.g., the power control loop corresponding to CP-OFDM-based uplink transmission), UE 120 may send, using a CP-OFDM-based waveform, the uplink transmission using an amount of power as dictated by the second power control loop.

In this way, different power control loops may be employed for uplink transmissions that use different types of uplink waveforms (e.g., a DFT-s-OFDM-based waveform and a CP-OFDM-based waveform), thereby providing a greater degree of uplink power control when using the different types of uplink waveforms. In this manner, the PAPR associated with one or more of the waveforms may be more efficient.

As indicated above, FIGS. 9A and 9B are provided as examples. Other examples are possible and may differ from what was described in connection with FIGS. 9A and 9B.

Figure 10:
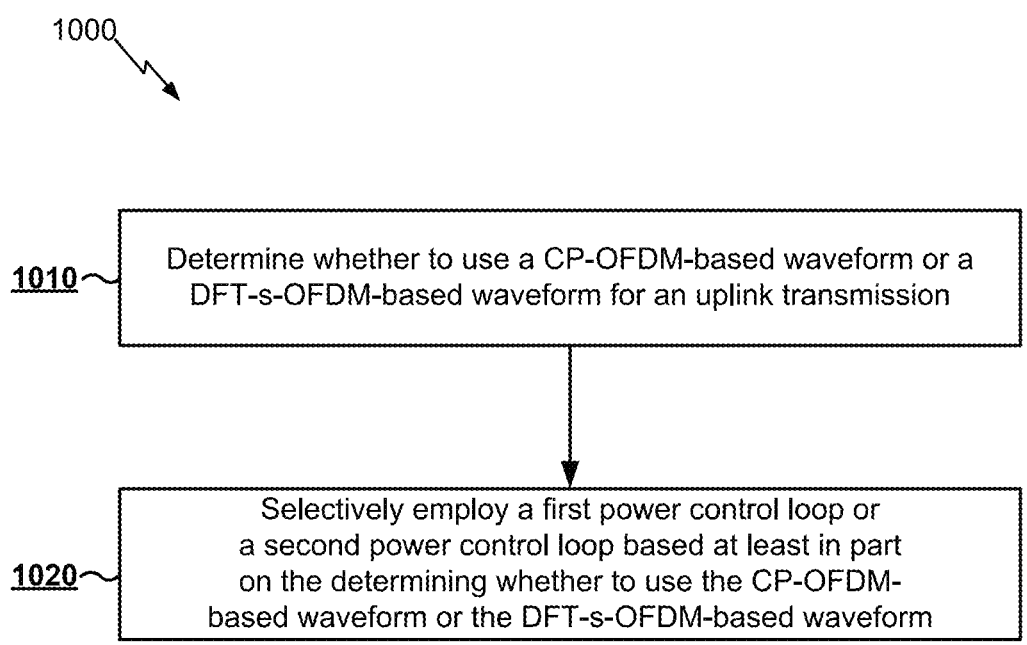
FIG. 10 is a diagram illustrating an example process performed, for example, by a wireless communications device, in accordance with various aspects of the present disclosure.

FIG. 10 is a diagram illustrating an example process 1000 performed, for example, by a wireless communications device, in accordance with various aspects of the present disclosure. Example process 1000 is an example where a wireless communications device (e.g., UE 120) employs different power control loops for uplink transmissions that use different uplink waveforms.

As shown in FIG. 10, in some aspects, process 1000 may include determining whether to use a CP-OFDM-based waveform or a DFT-s-OFDM-based waveform for an uplink transmission (block 1010). For example, UE 120 may determine whether UE 120 is to use a CP-OFDM-based waveform or a DFT-s-OFDM-based waveform for an uplink transmission.

In some aspects, UE 120 may determine whether UE 120 is to use a CP-OFDM-based waveform or a DFT-s-OFDM-based waveform for the uplink transmission based at least in part on an instruction provided by BS 110, as described above.

As further shown in FIG. 10, in some aspects, process 1000 may include selectively employing a first power control loop or a second power control loop based at least in part on the determining whether to use the CP-OFDM-based waveform or the DFT-s-OFDM-based waveform (block 1020). For example, UE 120 may selectively employ the first power control loop or the second power control loop based at least in part on determining whether to use the CP-OFDM-based waveform or the DFT-s-OFDM-based waveform.

In some aspects, UE 120 may employ the first power control loop based at least in part on information (e.g., stored by UE 120) indicating that UE 120 is to employ the first power control loop when UE 120 is to send an uplink transmission using a DFT-s-OFDM-based waveform. Similarly, in some aspects, UE 120 may employ the second power control loop based at least in part on information (e.g., stored by UE 120) indicating that UE 120 is to employ the second power control loop when UE 120 is to send an uplink transmission using a CP-OFDM-based waveform. In some aspects, the first power control loop is different from the second power control loop, as described above.

In some aspects, a first power control reference number point, associated with the first power control loop, is different from a second power control reference point, associated with the second power control loop.

In some aspects, the first power control reference point is associated with an initial transmit power for a CP-OFDM-based waveform. Additionally, or alternatively, the second power control reference point is associated with an initial transmit power for a DFT-s-OFDM-based waveform.

Although FIG. 1000 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
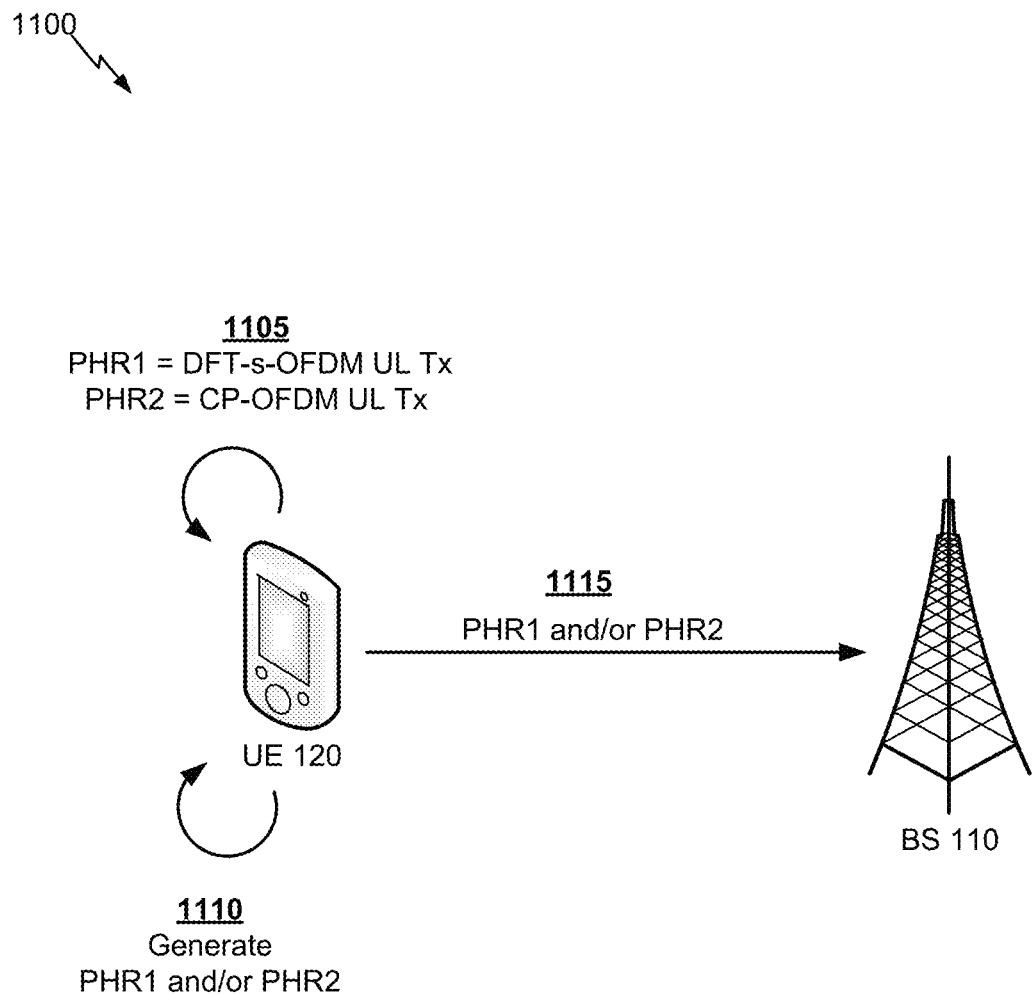
FIG. 11 is a diagram illustrating an example of a wireless communications device generating and transmitting a first type of power headroom report, associated with a DFT-s-OFDM-based type of uplink transmission, and/or a second type of power headroom report, associated with a CP-OFDM-based type of uplink transmission, in accordance with various aspects of the present disclosure.

FIG. 11 is an illustration of an example 1100 of generating and transmitting a first type of power headroom report (PHR), associated with a DFT-s-OFDM-based type of uplink transmission, and/or a second type PHR, associated with a CP-OFDM-based type of uplink transmission, in accordance with various aspects of the present disclosure.

In aspects, a PHR may include information that identifies an amount of transmission power that is available for use by UE 120 in addition to an amount of power associated with a given uplink transmission (e.g., an amount of transmission power that remains after subtracting an amount of transmission power, associated with the uplink transmission, from a total amount of transmission power available for use by UE 120). In some aspects, BS 110 may use a PHR to estimate an amount of uplink bandwidth that UE 120 may use for another uplink transmission. In other words, BS 110 may schedule uplink transmission resources based at least in part on the PHR, thereby avoiding wasteful allocation of uplink resources, for example.

In some aspects, when UE 120 is capable sending (e.g., based at least in part on an instruction from BS 110) an uplink transmission using either a DFT-s-OFDM-based waveform or a CP-OFDM-based waveform, UE 120 may be capable of generating and transmitting (e.g., in a single slot) multiple types of PHRs. For example, UE 120 may be capable of generating and transmitting a first type of PHR, associated with a DFT-s-OFDM-based waveform, for an uplink transmission, and a second type of PHR, associated with a CP-OFDM-based waveform, for the uplink transmission. In other words, UE 120 may be capable of generating and transmitting PHRs, associated with different types of uplink waveforms, for a particular uplink transmission. In some aspects, BS 110 may use the different types of PHRs as part of a determination of whether UE 120 is to send a later uplink transmission using a DFT-s-OFDM-based waveform or a CP-OFDM-based waveform.

In some aspects, UE 120 may associate different types of PHRs with different types of uplink waveforms. For example, as shown in FIG. 11, and by reference number 1105, UE 120 may associate a first type of PHR (e.g., PHR1) with a DFT-s-OFDM-based type of uplink transmission, and may associate a second type of PHR (e.g., PHR2) with a second type of uplink transmission.

In some aspects, UE 120 may associate the different types of PHRs with the different types of uplink waveforms based at least in part on information provided by BS 110. For example, BS 110 may provide information that identifies which type of PHR that UE 120 is to associate with each uplink waveform. In this way, UE 120 may ensure that associations between types of PHRs and types of uplink waveforms are identical on UE 120 and BS 110.

As further shown in FIG. 11, and by reference number 1110, UE 120 may generate the first type of PHR (e.g., associated with the DFT-s-OFDM-based type of uplink transmission) and/or the second type of PHR (e.g., associated with the CP-OFDM-based type of uplink transmission).

In some aspects, UE 120 may generate the first type of PHR and/or the second type of PHR based at least in part on determining that UE 120 is to transmit the first type of PHR and/or the second type of PHR. For example, UE 120 may determine that UE 120 is to generate the first type of PHR and/or the second type of PHR based at least in part on detecting an event that triggers generation of the first type of PHR and/or the second type of PHR. As a particular example, UE 120 may determine that UE 120 is to generate the first type of PHR and/or the second type of PHR based at least in part on detecting that an amount of downlink path loss satisfies a path loss threshold. As another example, UE 120 may determine that UE 120 is to generate the first type of PHR and/or the second type of PHR based at least in part on expiration of a PHR timer (e.g., when UE 120 is configured to provide the first type of PHR and/or the second type of PHR on a periodic basis).

In some aspects, UE 120 may generate the first type of PHR and/or the second type of PHR based at least in part on an actual uplink transmission. For example, UE 120 may generate the first type of PHR and the second type of PHR when UE 120 determines that UE 120 is to transmit a PHR and when UE 120 is scheduled to send an uplink transmission.

For example, if the actual uplink transmission is a PUSCH transmission that uses a DFT-s-OFDM-based waveform, UE 120 may generate the first type of PHR (e.g., associated with the DFT-s-OFDM-based type of uplink transmission) based at least in part on the actual uplink transmission by UE 120 that uses the DFT-s-OFDM-based waveform. In this example, UE 120 may generate the second type of PHR (e.g., associated with the CP-OFDM-based type of uplink transmission), based at least in part on an assumption of a CP-OFDM-based uplink transmission that corresponds to the DFT-s-OFDM-based uplink transmission (e.g., based at least in part on an assumption that the actual uplink transmission uses a CP-OFDM-based waveform rather than a DFT-s-OFDM-based waveform).

As another example, if the actual uplink transmission is a PUSCH transmission that uses a CP-OFDM-based waveform, UE 120 may generate the second type of PHR (e.g., associated with the CP-OFDM-based type of uplink transmission) based at least in part on the actual uplink transmission by UE 120 that uses the CP-OFDM-based waveform. In this example, UE 120 may generate the first type of PHR (e.g., associated with the DFT-s-OFDM-based type of uplink transmission), based at least in part on a reference uplink transmission.

The reference uplink transmission may include a default and/or a generic uplink transmission based at least in part on which a PHR may be generated (e.g., rather than based at least in part on an actual uplink transmission). In some aspects, the reference uplink transmission may be a transmission associated with one or more resource blocks and a particular MCS. Here, UE 120 may store information associated with the reference uplink transmission (e.g., information that identifies a number of the one or more resource blocks and information that identifies the particular MCS). In some aspects, UE 120 may be configured to assume a reference uplink transmission that has a same number of resource blocks as a number of resource blocks used for the actual uplink transmission that uses the CP-OFDM-based waveform. Continuing the above example, UE 120 may generate the first type of PHR based at least in part on the reference uplink transmission. Here, UE 120 may generate the first type of PHR based at least in part on the reference uplink transmission, rather than the actual uplink transmission, since resource allocation for the actual CP-OFDM-based uplink transmission may be non-contiguous (e.g., thereby preventing the first type of PHR from being generated based at least in part on the actual uplink transmission).

In some aspects, UE 120 may generate and provide a PHR, associated with a particular type of waveform (e.g., a waveform used for a current PUSCH transmission), and BS 110 may determine power headroom, associated with another type of waveform based on the PHR and an offset. The offset may be, for example, a power control reference point associated with the uplink transmission (e.g., when UE 120 uses different power control reference points for uplink transmissions using different waveforms, as described herein), a maximum transmit power associated with the uplink transmission (e.g., when UE 120 uses different maximum transmit powers for uplink transmission using different waveforms, as described herein), and/or the like. In such a case, UE 120 need to generate only a PHR associated with one type of waveform (e.g., rather than generating PHRs for each type of waveform, as described above), thereby conserving battery power and processing resources of UE 120. In this manner, the UE 120 may receive scheduling information regarding uplink transmission resources associated with second type of waveform based at least in part on the PHR for the first type of waveform.

In a case where the actual uplink transmission is a PUCCH transmission, and where the PUCCH supports both DFT-s-OFDM-based waveforms and CP-OFDM-based waveforms, UE 120 may generate the first type of PHR and/or the second type of PHR in a manner similar that described above with regard to an actual PUSCH transmission. However, if the PUCCH supports only one type of waveform (e.g., either a DFT-s-OFDM-based waveform or a CP-OFDM-based waveform), then UE 120 may generate a single type of PHR (e.g., the type of PHR associated with the type of uplink waveform supported by the PUCCH). In such a case, UE 120 may send only one type of PHR (e.g., the first type of PHR or the second type of PHR).

Additionally, or alternatively, UE 120 may generate the first type of PHR and/or the second type of PHR based at least in part on one or more reference uplink transmissions (e.g., when no actual and/or other uplink transmission occurs). For example, UE 120 may generate the first type of PHR and the second type of PHR when UE 120 determines that UE 120 is to transmit a PHR and is not scheduled to send an uplink transmission. Here, UE 120 may generate the first type of PHR based at least in part on one or more reference uplink transmissions. In some aspects, as described above, the reference uplink transmission may be associated with one or more resource blocks and a particular MCS (e.g., a lowest MCS assuming a DFT-s-OFDM-based transmission or a CP-OFDM-based transmission).

In some aspects, UE 120 may store information associated with a first reference uplink transmission for use in generating the first type of PHR, and information associated with a second type of uplink transmission for use in generating the second type of PHR. In some aspects, the first reference uplink transmission may be different from the second reference uplink transmission. Alternatively, the first reference uplink transmission may be the same as the second reference uplink transmission. Here, UE 120 may generate the first type of PHR based at least in part on the first reference uplink transmission and may generate the second type of PHR based at least in part on the second reference uplink transmission.

Returning to FIG. 11, and as shown by reference number 1115, UE 120 may transmit the generated PHRs (e.g., the first type of PHR and/or the second PHR to generated PHR) to BS 110. In some aspects, BS 110 may use the first type of PHR and/or the second type of PHR, received from UE 120, as a basis on which to determine whether UE 120 is to send another uplink transmission (e.g., a future PUSCH transmission) using either a DFT-s-OFDM-based waveform or a CP-OFDM-based waveform.

In some aspects, after making such a determination, BS 110 may provide, to UE 120, an indication whether UE 120 is to use a DFT-s-OFDM-based waveform or a CP-OFDM-based waveform for the other uplink transmission, and UE 120 may act accordingly, as described above.

As indicated above, FIG. 11 is provided as an example. Other examples are possible and may differ from what was described in connection with FIG. 11.

Figure 12:
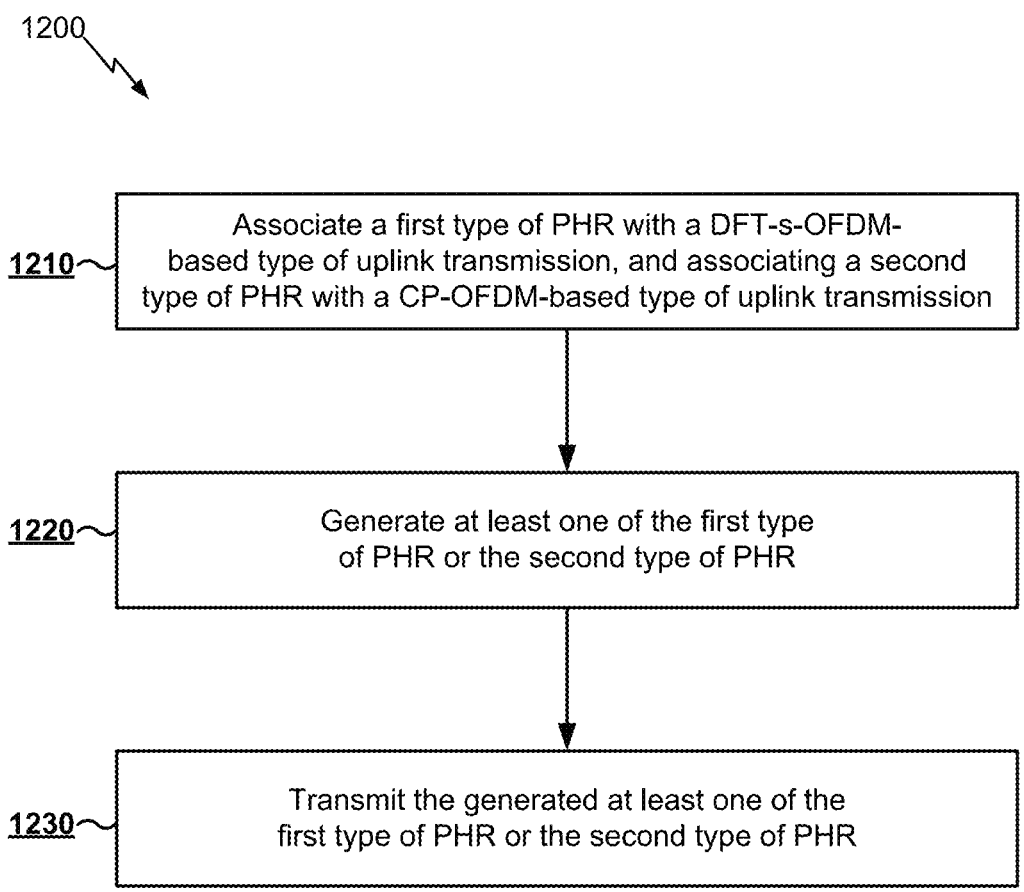
FIG. 12 is a diagram illustrating an example process performed, for example, by a wireless communications device, in accordance with various aspects of the present disclosure.

FIG. 12 is a diagram illustrating an example process 1200 performed, for example, by a wireless communications device, in accordance with various aspects of the present disclosure. Example process 1200 is an example where a wireless communications device (e.g., UE 120) generates and transmits a first type of PHR, associated with a DFT-s-OFDM-based type of uplink transmission, and/or a second type PHR associated with a CP-OFDM-based type of uplink transmission.

As shown in FIG. 12, in some aspects, process 1200 may include associating a first type of PHR with a DFT-s-OFDM-based type of uplink transmission, and associating a second type of PHR with a CP-OFDM-based type of uplink transmission (block 1210). For example, UE 120 may associate the first type of PHR with a DFT-s-OFDM-based type of uplink transmission, and may associate the second type of PHR with a CP-OFDM-based type of uplink transmission. For example, UE 120 may store, in memory, information that associates the first type of PHR with a DFT-s-OFDM-based type of uplink transmission and information that associates the second type of PHR with a CP-OFDM-based uplink transmission.

As further shown in FIG. 12, in some aspects, process 1200 may include generating at least one of the first type of PHR or the second type of PHR (block 1220). For example, UE 120 may generate at least one of the first type of PHR or the second type of PHR.

In some aspects, UE 120 may generate the at least one of the first type of PHR or the second type of PHR when UE 120 determines that UE 120 is to transmit the at least one of the first type of PHR or the second type of PHR.

In some aspects, UE 120 may generate the at least one of the first type of PHR or the second type of PHR based at least in part on actual uplink transmission. Additionally, or alternatively, UE 120 may generate the at least one of the first type of PHR or the second type of PHR based at least in part on a reference uplink transmission.

As further shown in FIG. 12, in some aspects, process 1200 may include transmitting the generated at least one of the first type of PHR or the second type of PHR (block 1230). For example, UE 120 may transmit the at least one of the first type of PHR or the second type of PHR to BS 110.

In some aspects, the DFT-s-OFDM-based type of uplink transmission is an actual uplink transmission of a DFT-s-OFDM-based waveform and the CP-OFDM-based type of uplink transmission corresponds to the actual uplink transmission of the DFT-s-OFDM-based waveform.

In some aspects, the CP-OFDM-based type of uplink transmission is an actual uplink transmission of a CP-OFDM-based waveform and the DFT-s-OFDM-based type of uplink transmission is a reference uplink transmission. Here, the reference uplink transmission may be associated with at least one resource block and a particular modulation and coding scheme. Alternatively, the reference uplink transmission may be associated with a same number of resource blocks used for the CP-OFDM-based type of uplink transmission.

In some aspects, when there is no other uplink transmission, the DFT-s-OFDM-based type of uplink transmission may be a first reference uplink transmission or the CP-OFDM-based type of uplink transmission may be a second reference uplink transmission. Here, at least one of the first reference uplink transmission or the second reference uplink transmission may be associated with at least one resource block and a particular modulation and coding scheme.

In some aspects, the DFT-s-OFDM-based type of uplink transmission and the CP-OFDM-based type of uplink transmission may be associated with at least one of PUSCH transmissions or PUCCH transmissions.

In some aspects, the DFT-s-OFDM-based type of uplink transmission and the CP-OFDM-based type of uplink transmission are associated with PUCCH transmissions.

In some aspects, process 1200 may further include receiving, by UE 120, an indication from BS 110 to use a DFT-s-OFDM-based waveform or a CP-OFDM-based waveform for a future uplink transmission based at least in part on UE 120 transmitting the generated at least one of the first type of PHR or the second type of PHR.

In some aspects, process 1200 may further include determining, by UE 120, that UE 120 is to transmit the at least one of the first type of PHR or the second type of PHR, and generating, by UE 120, the at least one of the first type of PHR or the second type of PHR based at least in part on determining that the determining that UE 120 is to transmit the at least one of the first type of PHR or the second type of PHR. In some aspects, process 1200 may further include determining, by UE 120, that UE 120 is to transmit the at least one of the first type of PHR or the second type of PHR based at least in part on detecting an event or based at least in part on expiration of a timer.

Although FIG. 1200 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13A:
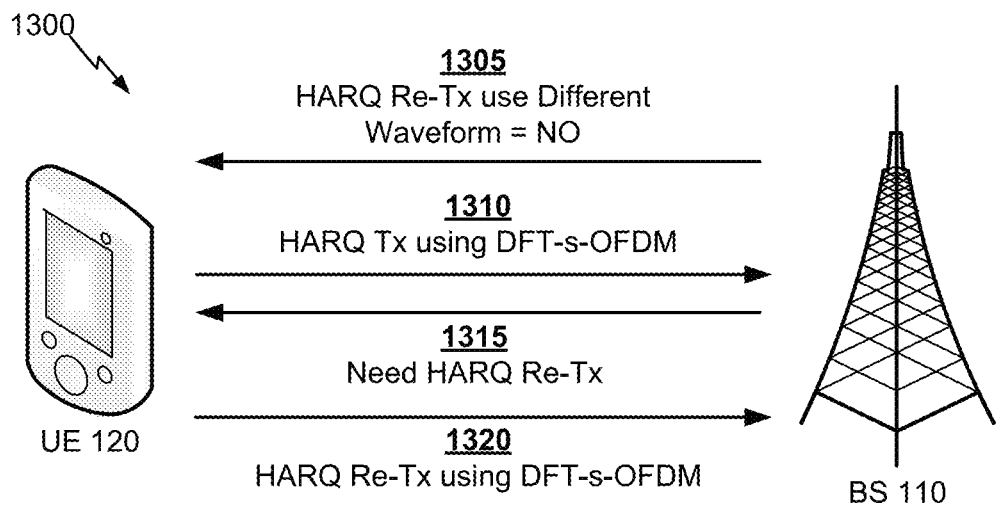
FIGS. 13A and 13B are diagrams illustrating an example of a wireless communications device selectively sending a hybrid automatic repeat request (HARQ) re-transmission using a particular uplink waveform based at least in part on information indicating whether the HARQ re-transmission is permitted to use an uplink waveform that is different from another uplink waveform used for a prior corresponding HARQ transmission or HARQ re-transmission, in accordance with various aspects of the present disclosure.
Figure 13B:
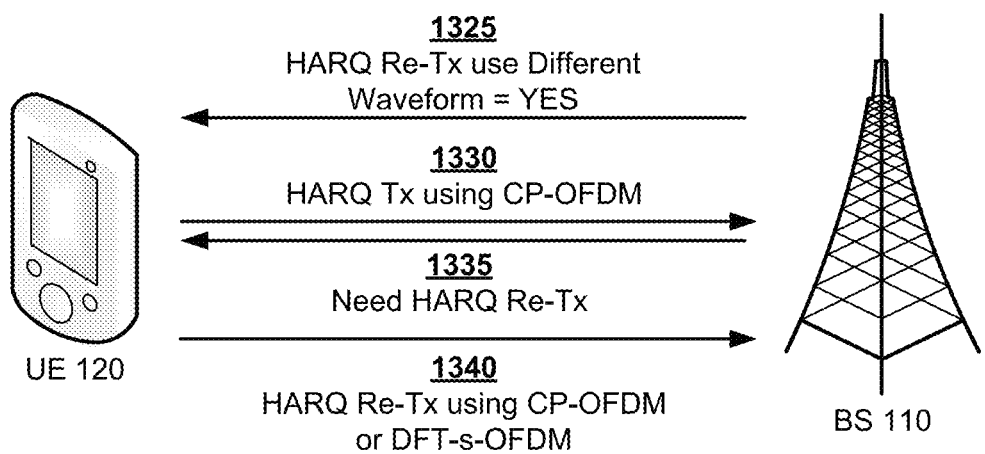

FIGS. 13A and 13B are illustrations of examples 1300 of UE 120 selectively sending a hybrid automatic repeat request (HARQ) re-transmission using a particular uplink waveform based at least in part on information indicating whether the HARQ re-transmission is permitted to use an uplink waveform that is different from another uplink waveform used for a prior corresponding HARQ transmission or HARQ re-transmission, in accordance with various aspects of the present disclosure.

A HARQ re-transmission may be needed when a prior HARQ transmission (e.g., or a prior HARQ re-transmission) is not successfully received by a device to which the prior HARQ transmission was sent. For example, UE 120 may send a HARQ transmission on the uplink to BS 110. Here, if BS 110 does not successfully receive the HARQ transmission (e.g., when BS 110 detects an error in the HARQ transmission), BS 110 may notify (e.g., via a physical HARQ indicator channel) UE 120 that UE 120 is to send a HARQ re-transmission to BS 110.

As described herein, UE 120 is capable of sending an uplink transmission using a DFT-s-OFDM-based waveform or a CP-OFDM-based waveform. As such, UE 120 may send a HARQ transmission using either a DFT-s-OFDM-based waveform or a CP-OFDM-based waveform.

In some aspects, it may be desirable to ensure that UE 120 sends a HARQ re-transmission using a same uplink waveform as an uplink waveform used for the prior HARQ transmission or HARQ re-transmission (e.g., in order to reduce complexity associated with processing the HARQ re-transmission by BS 110). Conversely, in some aspects, it may be desirable to permit UE 120 to send the HARQ re-transmission using a different uplink waveform than the uplink waveform used for the prior HARQ transmission or HARQ re-transmission (e.g., in order to provide flexibility in performing uplink power control for UE 120 when UE 120 sends a HARQ re-transmission).

In some aspects, UE 120 may determine whether to send a HARQ re-transmission using a same uplink waveform as the prior HARQ transmission or prior HARQ re-transmission based at least in part on information indicating whether the HARQ re-transmission is permitted to use an uplink waveform that is different from the uplink waveform used for the HARQ transmission or HARQ re-transmission (e.g., a prior corresponding HARQ transmission or a prior corresponding HARQ re-transmission). In some aspects, UE 120 may receive such information from BS 110.

For example, as shown in FIG. 13A, and by reference number 1305, BS 110 may determine whether UE 120 is to send the HARQ re-transmission using a same uplink waveform as the prior HARQ transmission or prior HARQ re-transmission, and may provide an indication to UE 120, accordingly. In a case where UE 120 receives information indicating that UE 120 is not permitted to send a HARQ re-transmission using a waveform that differs from a waveform of the prior HARQ transmission or prior HARQ re-transmission, UE 120 may send the HARQ re-transmission using the same waveform of the prior HARQ transmission or HARQ re-transmission.

For example, as shown in FIG. 13A, and by reference number 1310, UE 120 may send a HARQ transmission using a DFT-s-OFDM-based waveform (e.g., based at least in part on an instruction, provided to UE 120 by BS 110, indicating that UE 120 is to use a DFT-s-OFDM-based waveform for an uplink transmission in one or more resources blocks). As shown by reference number 1315, if BS 110 does not successfully receive the HARQ transmission, BS 110 may notify UE 120 that UE 120 is to send a HARQ re-transmission corresponding to the prior HARQ transmission.

In this example, UE 120 may determine, based at least in part on the information indicating that UE 120 is not permitted to send the HARQ re-transmission using an uplink waveform that differs from the uplink waveform of the prior HARQ transmission, that UE 120 is to send the HARQ re-transmission using a DFT-s-OFDM-based waveform (e.g., since the prior HARQ transmission used a DFT-s-OFDM-based waveform). As shown by reference number 1320, UE 120 may send the HARQ re-transmission using a DFT-s-OFDM-based waveform (e.g., in a resource block for which UE 120 is to use a DFT-s-OFDM-based waveform for an uplink transmission).

Alternatively, as shown in FIG. 13B by reference number 1325, UE 120 may receive information indicating that UE 120 is permitted to send a HARQ re-transmission using a waveform that differs from a waveform of the prior HARQ transmission. In such a case, UE 120 may send the HARQ re-transmission using the same waveform of the HARQ transmission or using a different waveform. In aspects, the UE 120 may send the HARQ re-transmission using a different waveform. For example, as shown by reference number 1330, UE 120 may send a HARQ transmission using a CP-OFDM-based waveform (e.g., based at least in part on an instruction, provided to UE 120 by BS 110, indicating that UE 120 is to use a CP-OFDM-based waveform for an uplink transmission in one or more resources blocks). As shown by reference number 1335, if BS 110 does not successfully receive the HARQ transmission, BS 110 may notify UE 120 that UE 120 is to send a HARQ re-transmission corresponding to the prior HARQ transmission.

In this example, UE 120 may determine, based at least in part on the information indicating that UE 120 is permitted to send the HARQ re-transmission using an uplink waveform that differs from the uplink waveform of the prior HARQ transmission, that UE 120 may send the HARQ re-transmission using a CP-OFDM-based waveform or a DFT-s-OFDM-based waveform. As shown by reference number 1340, UE 120 may send the HARQ re-transmission using either a CP-OFDM-based waveform or a DFT-s-OFDM-based waveform (e.g., in a next resource block for which UE 120 is to send an uplink transmission regardless of a type of uplink waveform to be used by UE 120 to send the uplink transmission).

As indicated above, FIGS. 13A and 13B are provided as examples. Other examples are possible and may differ from what was described in connection with FIGS. 13A and 13B.

Figure 14:
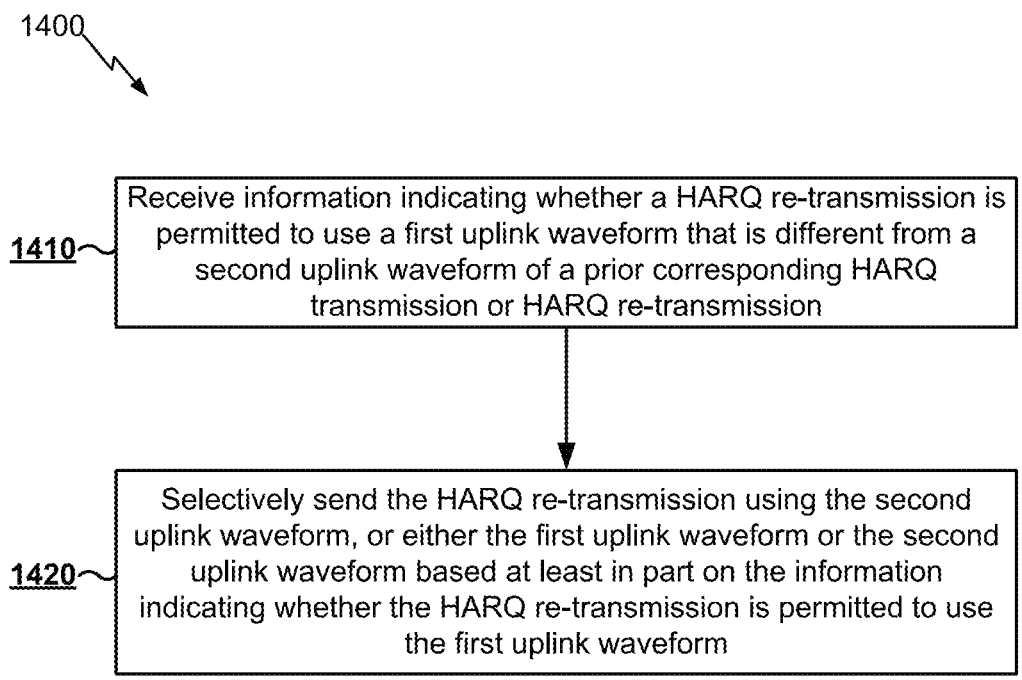
FIG. 14 is a diagram illustrating an example process performed, for example, by a wireless communications device, in accordance with various aspects of the present disclosure.

FIG. 14 is a diagram illustrating an example process 1400 performed, for example, by a wireless communications device, in accordance with various aspects of the present disclosure. Example process 1400 is an example where a wireless communications device (e.g., UE 120) selectively sends a HARQ re-transmission using a particular uplink waveform based at least in part on information indicating whether the HARQ re-transmission is permitted to use an uplink waveform that is different from another uplink waveform used for a prior corresponding HARQ transmission or a prior corresponding HARQ re-transmission.

As shown in FIG. 14, in some aspects, process 1400 may include receiving information indicating whether a HARQ re-transmission is permitted to use a first uplink waveform that is different from a second uplink waveform of a prior corresponding HARQ transmission or a prior corresponding HARQ re-transmission (block 1410). For example, UE 120 may receive information indicating whether a HARQ re-transmission is permitted to use a first uplink waveform that is different from a second uplink waveform of a prior corresponding HARQ transmission or the prior corresponding HARQ re-transmission.

As further shown in FIG. 14, in some aspects, process 1400 may include selectively sending the HARQ re-transmission using the second uplink waveform, or either the first uplink waveform or the second uplink waveform based at least in part on the information indicating whether the HARQ re-transmission is permitted to use the first uplink waveform (block 1420). For example, UE 120 may selectively send the HARQ re-transmission using the second uplink waveform, or either the first uplink waveform or the second uplink waveform based at least in part on the information indicating whether the HARQ re-transmission is permitted to use the first uplink waveform.

In some aspects, the first uplink waveform is a DFT-s-OFDM-based waveform and the second uplink waveform is a CP-OFDM-based waveform.

In some aspects, the first uplink waveform is a CP-OFDM-based waveform and the second uplink waveform is a DFT-s-OFDM-based waveform.

Although FIG. 1400 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15A:
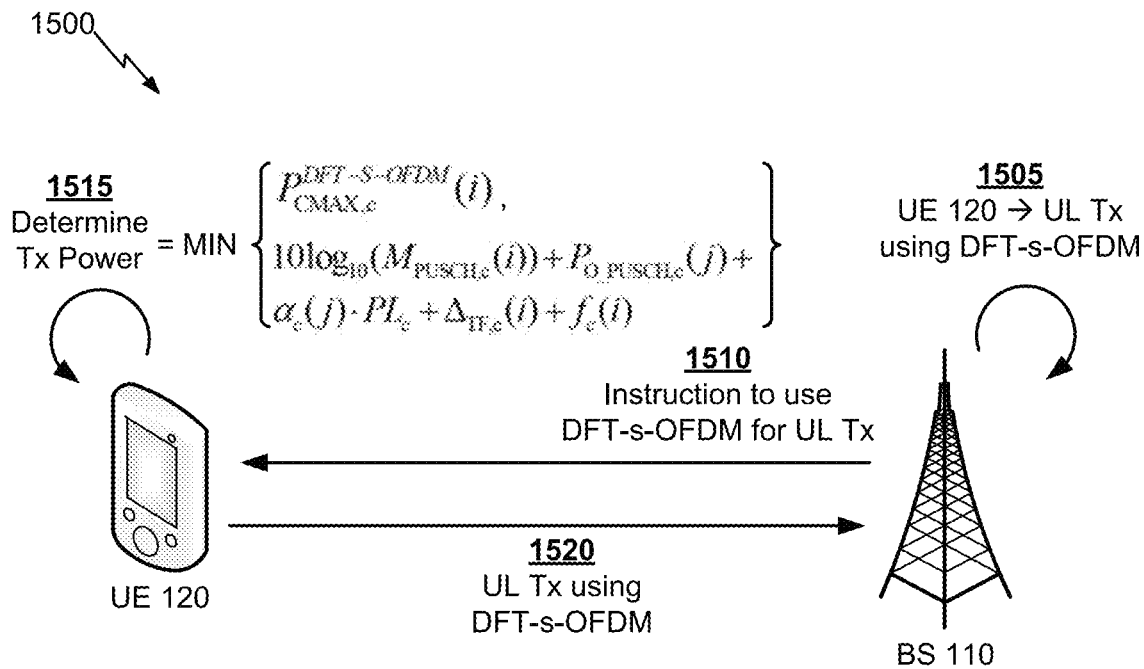
FIGS. 15A and 15B are diagrams illustrating an example of a UE using different maximum transmit powers to determine transmit powers for uplink transmissions that use different uplink waveforms, in accordance with various aspects of the present disclosure.
Figure 15B:
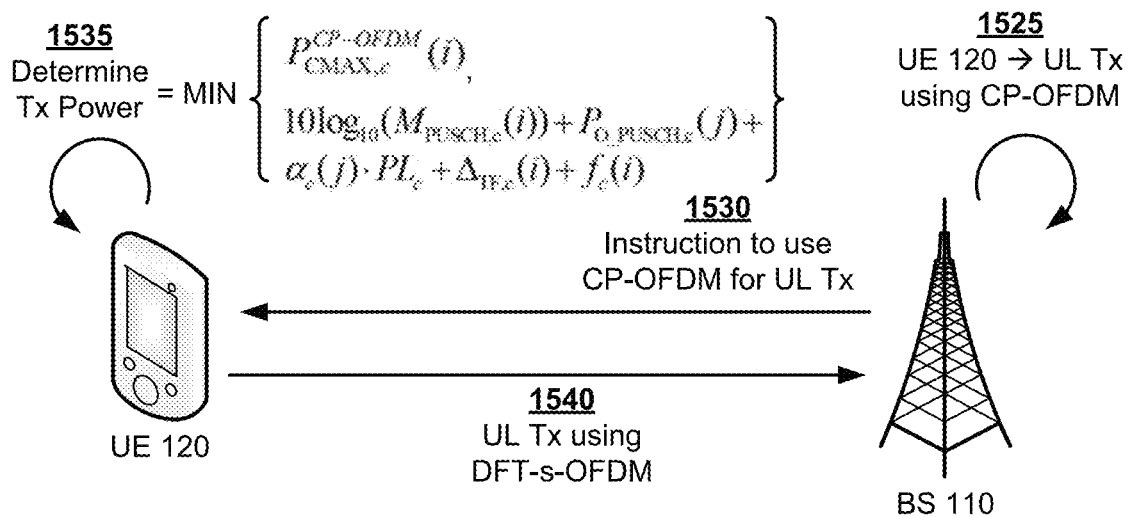

FIGS. 15A and 15B are illustrations of examples 1500 of a UE using different maximum transmit powers to determine transmit powers for uplink transmissions that use different uplink waveforms, in accordance with various aspects of the present disclosure. Example 1500 includes a UE 120 capable of sending, to BS 110, an uplink transmission using a CP-OFDM-based waveform and/or a DFT-s-OFDM-based waveform.

In some aspects, UE 120 may determine whether UE 120 is to use a DFT-s-OFDM-based waveform or a CP-OFDM-based waveform for an uplink transmission based at least in part on an instruction provided by BS 110. For example, in some aspects, BS 110 may determine whether UE 120 is to use a DFT-s-OFDM-based waveform or a CP-OFDM-based waveform based at least in part on a link budget associated with UE 120, as described above. As another example, in some aspects, BS 110 may determine whether UE 120 is to use a DFT-s-OFDM-based waveform or a CP-OFDM-based waveform based at least in part on one or more power headroom reports, provided to BS 110 by UE 120, as described above.

For the purposes of FIG. 15A, and as shown by reference number 1505, BS 110 determines based at least in part on a link budget and/or a power headroom report, associated with UE 120, that UE 120 is to use a DFT-s-OFDM-based waveform for the uplink transmission.

As further shown in FIG. 15A, and by reference number 1510, BS 110 may provide, to UE 120, an instruction indicating that UE 120 is to use a DFT-s-OFDM-based waveform for the uplink transmission. In some aspects, BS 110 may provide the instruction to UE 120 based at least in part on BS 110 scheduling the uplink transmission. Here, BS 110 may provide the instruction when BS 110 provides, to UE 120, scheduling information that identifies one or more resource blocks in which UE 120 is to send the uplink transmission.

In some aspects, a particular maximum transmit power, associated with controlling transmission power of UE 120, may be used by UE 120 based at least in part on the type of uplink waveform to be used for the uplink transmission. A maximum transmit power is a maximum power at which UE 120 may transmit in a given subframe (i) for a given serving cell (c). In some aspects, UE 120 may configure different maximum transmit powers for different types of waveforms. For example, UE 120 may configure a first maximum transmit power ($P_{CMAX,c}^{DFT\text{-}s\text{-}OFDM}(i)$) to be used for determining a transmit power of an uplink transmission that uses a DFT-s-OFDM-based waveform, and may configure a second maximum transmit power ($P_{CMAX,c}^{CP\text{-}OFDM}(i)$) for determining a transmit power of an uplink transmission that uses a CP-OFDM-based waveform.

In some aspects, UE 120 may determine at least one of the first maximum transmit power or the second maximum transmit power based at least in part on, for example, a maximum allowed UE power (e.g., signaled by higher layers for the serving cell), one or more allowed power relaxations associated with the serving cell, a nominal maximum UE power for a power class of UE 120, and/or the like. In some aspects, UE 120 may determine the second maximum transmit power based at least in part on, for example, the first maximum transmit power. For example, UE 120 may determine the first maximum transmit power, and may adjust the first maximum transmit power by a power offset ($\delta_{offset}$) to obtain the second maximum transmit power as follows:

$$P_{CMAX,c}^{CP\text{-}OFDM}(i) = P_{CMAX,c}^{DFT\text{-}S\text{-}OFDM}(i) - \delta_{offset\_}$$

Alternatively, UE 120 may determine the first maximum transmit power based at least in part on the second maximum transmit power (e.g., by adding the power offset to the second maximum transmit power to obtain the first maximum transmit power). In some aspects, UE 120 may determine the power offset based at least in part on a configuration of UE 120, based at least in part on a measurement performed by UE 120, based at least in part on a configuration signaled by BS 110, and/or the like.

In some aspects, UE 120 may use the first maximum transmit power to determine a transmit power for an uplink transmission that uses a DFT-s-OFDM-based waveform, and may use the second (e.g., different) maximum transmit power to determine a transmit power for an uplink transmission that uses a CP-OFDM-based waveform. For example, returning to FIG. 15A, and as shown by reference number 1510, UE 120 may receive the instruction to send the uplink transmission using the DFT-s-OFDM-based waveform, and may determine a transmit power for the uplink transmission using the DFT-s-OFDM-based waveform based at least in part on the first maximum transmit power associated with the DFT-s-OFDM-based waveform. For example, UE 120 may determine the transmit power for the uplink transmission ($P_{PUSCH,c}(i)$) as follows:

$$P_{PUSCH,c}(i) = \min\left\{ \begin{array}{l} P_{CMAX,c}^{DFT\text{-}S\text{-}OFDM}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{array} \right\} [dBm]$$

where $10\log_{10}(M_{PUSCH,c}(i))$ is a bandwidth factor associated with the serving cell, $P_{O_{PUSCH,c}}(j) + \alpha(j) PL_c$ is a basic open loop operating point associated with the serving cell, and $_{TF,c}(i) + f_c(i)$ is a dynamic offset associated with the serving cell. Here, UE 120 may determine the transmit power of the DFT-s-OFDM-based uplink transmission as the minimum of the first maximum transmit power and the transmit power calculated based at least in part on the bandwidth factor, the basic open loop operating point, and the dynamic offset.

As further shown in FIG. 15A, and by reference number 1520, based at least in part on receiving the instruction and using the first maximum transmit power (e.g., the maximum transmit power corresponding to DFT-s-OFDM-based uplink transmissions) to determine a transmit power for the uplink transmission, UE 120 may send, using a DFT-s-OFDM-based waveform, the uplink transmission in accordance with the determined amount of transmit power.

FIG. 15B is an example illustrating use of the second maximum transmit power for determining a transmit power for sending an uplink transmission using a CP-OFDM-based waveform. As shown in FIG. 15B, and by reference number 1525, BS 110 determines (e.g., based at least in part on a link budget and/or a power headroom report associated with UE 120) that UE 120 is to send an uplink transmission (e.g., an uplink transmission after (or before or instead of) the uplink transmission associated with FIG. 15A) using a CP-OFDM-based waveform.

As shown by reference number 1530, BS 110 may provide, to UE 120, an instruction that UE 120 is to use a CP-OFDM-based waveform for the uplink transmission. As shown by reference number 1535, UE 120 may receive the instruction to send the uplink transmission using the CP-OFDM-based waveform, and may determine a transmit power for the uplink transmission using the CP-OFDM-based waveform based at least in part on the second maximum transmit power associated with the CP-OFDM-based waveform. For example, UE 120 may determine the transmit power for the uplink transmission ($P_{PUSCH,c}(i)$) as follows:

$$P_{PUSCH,c}(i) = \min \begin{Bmatrix} P^{CP-OFDM}_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{Bmatrix} [dBm]$$

Here, UE 120 may determine the transmit power of the CP-OFDM-based uplink transmission as the minimum of the second maximum transmit power and the transmit power calculated based at least in part on the bandwidth factor, the basic open loop operating point, and the dynamic offset.

As further shown in FIG. 15B, and by reference number 1540, based at least in part on receiving the instruction and using the second maximum transmit power (e.g., the maximum transmit power corresponding to CP-OFDM-based uplink transmissions) to determine the transmit power for the uplink transmission, UE 120 may send, using a CP-OFDM-based waveform, the uplink transmission in accordance with the determined amount of power.

In this way, different maximum transmission powers may be used to determine transmit powers for uplink transmissions that use different types of uplink waveforms (e.g., a DFT-s-OFDM-based waveform and a CP-OFDM-based waveform), thereby providing a greater degree of uplink power control when using the different types of uplink waveforms.

In some aspects, UE 120 may signal the first maximum transmit power, the second maximum transmit power, and/or the power offset to BS 110. For example, UE 120 may signal the first maximum transmit power and the second maximum transmit power, the first maximum transmit power and the power offset (e.g., such that BS 110 may derive the second maximum transmit power), the second maximum transmit power and the power offset (e.g., such that the BS 110 may derive the first maximum transmit power), and/or the like. In some aspects, UE 120 may provide the first maximum transmit power, the second maximum transmit power, and/or the power offset via RRC signaling.

As indicated above, FIGS. 15A and 15B are provided as examples. Other examples are possible and may differ from what was described in connection with FIGS. 15A and 15B. In aspects, $P_{O_{PUSCH},c}(j)$ and/or the basic open loop operating point may be the same for a DFT-s-OFDM-based waveform and a CP-OFDM-based waveform, where $P_{O_{PUSCH},c}(j)$ is described in 3GPP TS 36.213 § 5.1.1.2.

Figure 16:
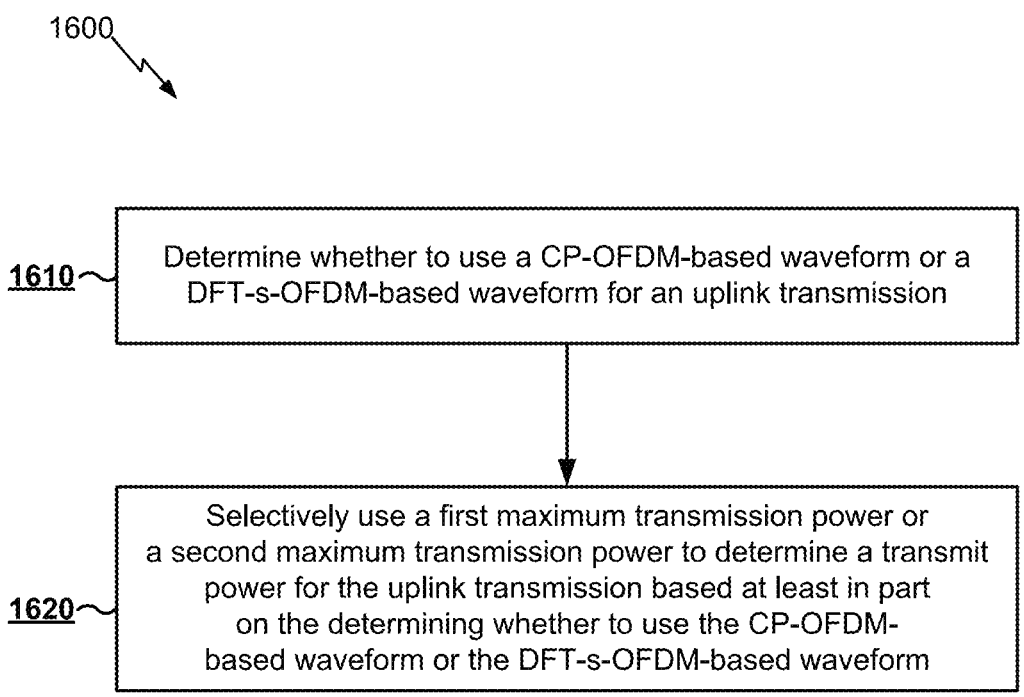
FIG. 16 is a diagram illustrating an example process performed, for example, by a wireless communications device, in accordance with various aspects of the present disclosure.

FIG. 16 is a diagram illustrating an example process 1600 performed, for example, by a wireless communications device, in accordance with various aspects of the present disclosure. Example process 1600 is an example where a wireless communications device (e.g., UE 120) uses different maximum transmit powers to determine transmit powers for uplink transmissions that use different uplink waveforms.

As shown in FIG. 16, in some aspects, process 1600 may include determining whether to use a CP-OFDM-based waveform or a DFT-s-OFDM-based waveform for an uplink transmission (block 1610). For example, UE 120 may determine whether UE 120 is to use a CP-OFDM-based waveform or a DFT-s-OFDM-based waveform for an uplink transmission.

In some aspects, UE 120 may determine whether UE 120 is to use a CP-OFDM-based waveform or a DFT-s-OFDM-based waveform for the uplink transmission based at least in part on an instruction provided by BS 110, as described above.

As further shown in FIG. 16, in some aspects, process 1600 may include selectively using a first maximum transmit power or a second maximum transmit power to determine a transmit power for the uplink transmission based at least in part on the determining whether to use the CP-OFDM-based waveform or the DFT-s-OFDM-based waveform (block 1620). For example, UE 120 may selectively use the first maximum transmit power or the second maximum transmit power to determine the transmit power for the uplink transmission based at least in part on determining whether to use the CP-OFDM-based waveform or the DFT-s-OFDM-based waveform.

In some aspects, the first maximum transmit power is associated with uplink transmission using DFT-s-OFDM-based waveforms and the second maximum transmit power is associated with uplink transmission using CP-OFDM based waveforms.

In some aspects, the second maximum transmit power is determined based at least in part on applying a power offset to the first maximum transmit power.

In some aspects, the first maximum transmit power is determined based at least in part on applying a power offset to the second maximum transmit power.

In some aspects, the first maximum transmit power differs from the second maximum transmit power by a power offset.

In some aspects, the transmit power for the uplink transmission is determined based at least in part on selectively comparing the first maximum transmit power or the second maximum transmit power to a calculated transmit power, wherein the calculated transmit power is calculated based at least in part on a bandwidth factor, a basic open loop operating point, and a dynamic offset.

In some aspects, at least two of the first maximum transmit power, the second maximum transmit power, and a power offset are signaled to a base station.

Although FIG. 1600 shows example blocks of process 1600, in some aspects, process 1600 may include additional blocks, fewer blocks, different blocks, or differently arranged blocks than those depicted in FIG. 16. Additionally, or alternatively, two or more of the blocks of process 1600 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of wireless communications by a wireless communications device, comprising:
   determining whether to use a cyclic prefix orthogonal frequency-division multiplexing (CP-OFDM)-based waveform or a discrete Fourier transform spread orthogonal frequency-division multiplexing (DFT-s-OFDM) based waveform for an uplink transmission;
   selectively employing a first power control loop or a second power control loop for the uplink transmission based at least in part on the determining whether to use the CP-OFDM-based waveform or the DFT-s-OFDM-based waveform,
       the first power control loop being associated with a first power control reference point, and
       the second power control loop being associated with a second power control reference point,
           the second power control reference point being different from the first power control reference point;
   receiving information indicating whether an uplink retransmission is permitted to use a waveform different than a waveform used for the uplink transmission; and
   selectively sending the uplink retransmission using the CP-OFDM-based waveform or the DFT-s-OFDM-based waveform based at least in part on the waveform used for the uplink transmission and the information indicating whether the uplink retransmission is permitted to use the waveform different than the waveform used for the uplink transmission.

2. The method of claim 1, wherein the first power control loop is different from the second power control loop.

3. The method of claim 1, wherein at least one of the first power control reference point is associated with an initial transmit power for the CP-OFDM-based waveform, or the second power control reference point is associated with an initial transmit power for the DFT-s-OFDM-based waveform.

4. The method of claim 1, wherein selectively sending the uplink retransmission includes:
   sending the uplink retransmission using the waveform different than the waveform used for the uplink transmission when the information indicates the uplink retransmission is permitted to use the waveform different than the waveform used for the uplink transmission.

5. The method of claim 1, wherein selectively sending the uplink retransmission includes:
   sending the uplink retransmission using a same waveform than the waveform used for the uplink transmission when the information indicates the uplink retransmission is not permitted to use the waveform different than the waveform used for the uplink transmission.

6. The method of claim 1, wherein the information indicating whether the uplink retransmission is permitted to use the waveform different than the waveform used for the uplink transmission is received from a base station.

7. A method of wireless communications by a wireless communications device, comprising:
   determining whether to use a cyclic prefix orthogonal frequency-division multiplexing (CP-OFDM)-based waveform or a discrete Fourier transform spread orthogonal frequency-division multiplexing (DFT-s-OFDM)-based waveform for an uplink transmission;
   selectively using a first maximum transmit power or a second maximum transmit power to determine a transmit power for the uplink transmission based at least in part on the determining whether to use the CP-OFDM-based waveform or the DFT-s-OFDM-based waveform,
       wherein the first maximum transmit power is different from the second maximum transmit power;
   receiving information indicating whether an uplink retransmission is permitted to use a waveform different than a waveform used for the uplink transmission;
   selectively sending the uplink retransmission using the CP-OFDM-based waveform or the DFT-s-OFDM-based waveform based at least in part on the waveform used for the uplink transmission and the information indicating whether the uplink retransmission is permitted to use the waveform different than the waveform used for the uplink transmission.

8. The method of claim 7, wherein the first maximum transmit power is associated with uplink transmissions using DFT-s-OFDM-based waveforms and the second maximum transmit power is associated with uplink transmissions using CP-OFDM based waveforms.

9. The method of claim 7, wherein the second maximum transmit power is determined based at least in part on applying a power offset to the first maximum transmit power.

10. The method of claim 7, wherein the first maximum transmit power is determined based at least in part on applying a power offset to the second maximum transmit power.

11. The method of claim 7, wherein the first maximum transmit power differs from the second maximum transmit power by a power offset.

12. The method of claim 7, wherein the transmit power for the uplink transmission is determined based at least in part on selectively comparing the first maximum transmit power or the second maximum transmit power to a calculated transmit power,
wherein the calculated transmit power is calculated based at least in part on a bandwidth factor, a basic open loop operating point, and a dynamic offset.

13. The method of claim 7, wherein at least two of the first maximum transmit power, the second maximum transmit power, and a power offset are signaled to a base station.

14. The method of claim 13, wherein the at least two of the first maximum transmit power, the second maximum transmit power, and the power offset are signaled to the base station via radio resource control (RRC) signaling.

15. The method of claim 7, wherein the transmit power for the uplink transmission is determined based at least in part on selectively comparing the first maximum transmit power or the second maximum transmit power to a calculated transmit power,
wherein the calculated transmit power is calculated based at least in part on $P_{O_{PUSCH},c}(j)$.

16. The method of claim 7, wherein $P_{O_{PUSCH},c}(j)$ is the same for a DFT-s-OFDM-based waveform and a CP-OFDM-based waveform.

17. The method of claim 7, wherein selectively sending the uplink retransmission includes:
sending the uplink retransmission using the waveform different than the waveform used for the uplink transmission when the information indicates the uplink retransmission is permitted to use the waveform different than the waveform used for the uplink transmission.

18. The method of claim 7, wherein selectively sending the uplink retransmission includes:
sending the uplink retransmission using a same waveform than the waveform used for the uplink transmission when the information indicates the uplink retransmission is not permitted to use the waveform different than the waveform used for the uplink transmission.

19. The method of claim 7, wherein the information indicating whether the uplink retransmission is permitted to use the waveform different than the waveform used for the uplink transmission is received from a base station.

20. A wireless communications device, comprising:
a memory; and
one or more processors coupled to the memory, the memory and the one or more processors configured to:
determine whether to use a cyclic prefix orthogonal frequency-division multiplexing (CP-OFDM)-based waveform or a discrete Fourier transform spread orthogonal frequency-division multiplexing (DFT-s-OFDM) based waveform for an uplink transmission;
selectively employ a first power control loop or a second power control loop for the uplink transmission based at least in part on the determining whether to use the CP-OFDM-based waveform or the DFT-s-OFDM-based waveform,
the first power control loop being associated with a first power control reference point, and
the second power control loop being associated with a second power control reference point,
the second power control reference point being different from the first power control reference point;
receive information indicating whether an uplink retransmission is permitted to use a waveform different than a waveform used for the uplink transmission; and
selectively send the uplink retransmission using the CP-OFDM-based waveform or the DFT-s-OFDM-based waveform based at least in part on the waveform used for the uplink transmission and the information indicating whether the uplink retransmission is permitted to use the waveform different than the waveform used for the uplink transmission.

21. The wireless communications device of claim 20, wherein the first power control loop is different from the second power control loop.

22. The wireless communications device of claim 20, wherein at least one of the first power control reference point is associated with an initial transmit power for the CP-OFDM-based waveform, or the second power control reference point is associated with an initial transmit power for the DFT-s-OFDM-based waveform.

23. A wireless communications device, comprising:
a memory; and
one or more processors coupled to the memory, the memory and the one or more processors configured to:
determine whether to use a cyclic prefix orthogonal frequency-division multiplexing (CP-OFDM)-based waveform or a discrete Fourier transform spread orthogonal frequency-division multiplexing (DFT-s-OFDM)-based waveform for an uplink transmission;
selectively use a first maximum transmit power or a second maximum transmit power to determine a transmit power for the uplink transmission based at least in part on the determining whether to use the CP-OFDM-based waveform or the DFT-s-OFDM-based waveform,
wherein the first maximum transmit power is different from the second maximum transmit power;
receive information indicating whether an uplink retransmission is permitted to use a waveform different than a waveform used for the uplink transmission; and
selectively send the uplink retransmission using the CP-OFDM-based waveform or the DFT-s-OFDM-based waveform based at least in part on the waveform used for the uplink transmission and the information indicating whether the uplink retransmission is permitted to use the waveform different than the waveform used for the uplink transmission.

24. The wireless communications device of claim 23, wherein the first maximum transmit power is associated with uplink transmissions using DFT-s-OFDM-based waveforms and the second maximum transmit power is associated with uplink transmissions using CP-OFDM based waveforms.

25. The wireless communications device of claim 23, wherein the second maximum transmit power is determined based at least in part on applying a power offset to the first maximum transmit power.

26. The wireless communications device of claim 23, wherein the first maximum transmit power is determined based at least in part on applying a power offset to the second maximum transmit power.

27. The wireless communications device of claim 23, wherein the first maximum transmit power differs from the second maximum transmit power by a power offset.

28. The wireless communications device of claim 23, wherein the transmit power for the uplink transmission is determined based at least in part on selectively comparing the first maximum transmit power or the second maximum transmit power to a calculated transmit power,
   wherein the calculated transmit power is calculated based at least in part on a bandwidth factor, a basic open loop operating point, and a dynamic offset.

29. The wireless communications device of claim 23, wherein at least two of the first maximum transmit power, the second maximum transmit power, and a power offset are signaled to a base station.

30. The wireless communications device of claim 29, wherein the at least two of the first maximum transmit power, the second maximum transmit power, and the power offset are signaled to the base station via radio resource control (RRC) signaling.

* * * * *